(12) United States Patent
Tong

(10) Patent No.: US 11,472,252 B2
(45) Date of Patent: Oct. 18, 2022

(54) ELECTRONIC COMPRESSION AND REBOUND CONTROL

(71) Applicant: Fox Factory, Inc., Duluth, GA (US)

(72) Inventor: Ivan Tong, San Diego, CA (US)

(73) Assignee: Fox Factory, Inc., Duluth, GA (US)

( * ) Notice: Subject to any disclaimer, the term of this patent is extended or adjusted under 35 U.S.C. 154(b) by 32 days.

(21) Appl. No.: 16/986,582

(22) Filed: Aug. 6, 2020

(65) Prior Publication Data

US 2020/0361271 A1 Nov. 19, 2020

Related U.S. Application Data

(63) Continuation of application No. 15/482,507, filed on Apr. 7, 2017, now Pat. No. 10,737,546.

(Continued)

(51) Int. Cl.
*F16F 9/48* (2006.01)
*B60G 17/08* (2006.01)
(Continued)

(52) U.S. Cl.
CPC ............. *B60G 17/08* (2013.01); *B60G 13/08* (2013.01); *F16F 9/065* (2013.01); *F16F 9/325* (2013.01); *F16F 9/46* (2013.01)

(58) Field of Classification Search
CPC .... F16F 9/064; F16F 9/096; F16F 9/46; F16F 9/325; F16F 9/446; F16F 9/464; B60G 17/0152; B60G 17/08
(Continued)

(56) References Cited

U.S. PATENT DOCUMENTS

| 435,995 A | 9/1890 | Dunlop |
| 1,078,060 A | 11/1913 | Newman |

(Continued)

FOREIGN PATENT DOCUMENTS

| DE | 1555311 A1 | 8/1970 |
| DE | 3613386 A1 | 10/1986 |

(Continued)

OTHER PUBLICATIONS

European Search Report for European Application No. 19155995, 11 pages, dated Aug. 28, 2019.

(Continued)

*Primary Examiner* — Christopher P Schwartz

(57) ABSTRACT

An electronic valve assembly for a vehicle suspension damper is described in which a first electronic valve is disposed along a fluid flow path extending between a compression region of a damping cylinder and a fluid reservoir chamber. The first electronic valve controls flow of fluid from the compression region into the fluid reservoir chamber. A second electronic valve is disposed along a fluid flow path extending between a rebound region of the damping cylinder and the compression region. The second electronic valve controls flow of fluid from the rebound region into the compression. The first electronic valve does not reside in the fluid flow path extending from the rebound region into the compression region, and the second electronic valve does not reside in the fluid flow path extending from the compression region into the fluid reservoir chamber.

25 Claims, 7 Drawing Sheets

Related U.S. Application Data

(60) Provisional application No. 62/320,368, filed on Apr. 8, 2016.

(51) Int. Cl.
*B60G 13/08* (2006.01)
*F16F 9/32* (2006.01)
*F16F 9/46* (2006.01)
*F16F 9/06* (2006.01)

(58) Field of Classification Search
USPC .......... 188/266.5, 266, 6, 318, 319.1, 319.2, 188/322.2, 322.21, 266.6
See application file for complete search history.

(56) References Cited

U.S. PATENT DOCUMENTS

| | | |
|---|---|---|
| 1,307,502 A | 6/1919 | Martin |
| 1,313,763 A | 8/1919 | Thomas |
| 1,409,849 A | 3/1922 | Haeberlein |
| 1,468,652 A | 9/1923 | Storey et al. |
| 1,492,731 A | 5/1924 | Kerr |
| 1,560,477 A | 11/1925 | Kessler |
| 1,571,788 A | 2/1926 | Bramle, Jr. |
| 1,575,973 A | 3/1926 | Coleman |
| 1,655,786 A | 1/1928 | Guerritore et al. |
| 1,923,011 A | 8/1933 | Moulton |
| 1,948,600 A | 2/1934 | Templeton |
| 1,970,239 A | 8/1934 | Klaas |
| 2,018,312 A | 10/1935 | Moulton |
| 2,098,119 A | 11/1937 | White |
| 2,115,072 A | 4/1938 | Hunt et al. |
| 2,122,407 A | 7/1938 | Chisholm |
| 2,186,266 A | 1/1940 | Henry |
| 2,259,437 A | 10/1941 | Dean |
| 2,354,340 A | 7/1944 | Utter |
| 2,363,867 A | 11/1944 | Isely |
| 2,492,331 A | 12/1949 | Spring |
| 2,518,553 A | 8/1950 | Kieber |
| 2,540,525 A | 2/1951 | Howarth et al. |
| 2,559,633 A | 7/1951 | Maurice et al. |
| 2,588,520 A | 3/1952 | Halgren et al. |
| 2,697,600 A | 12/1954 | Gregoire |
| 2,705,119 A | 3/1955 | Ingwer |
| 2,725,076 A | 11/1955 | Hansen et al. |
| 2,729,308 A | 1/1956 | Koski et al. |
| 2,778,378 A | 1/1957 | Presnell |
| 2,784,962 A | 3/1957 | Sherburne |
| 2,809,722 A | 10/1957 | Smith |
| 2,838,140 A | 6/1958 | Rasmusson et al. |
| 2,846,028 A | 8/1958 | Gunther |
| 2,853,974 A | 9/1958 | Hewitt |
| 2,879,971 A | 3/1959 | Demay |
| 2,883,181 A | 4/1959 | Hogan et al. |
| 2,897,613 A | 8/1959 | Davidson et al. |
| 2,924,304 A | 2/1960 | Patriquin |
| 2,941,629 A | 6/1960 | Etienne et al. |
| 2,967,065 A | 1/1961 | Schwendner |
| 2,973,744 A | 3/1961 | Hennells |
| 2,991,804 A | 7/1961 | Merkle |
| 3,003,595 A | 10/1961 | Patriquin et al. |
| 3,056,598 A | 10/1962 | Ransom et al. |
| 3,071,394 A | 1/1963 | John |
| 3,073,586 A | 1/1963 | Hartel et al. |
| 3,074,709 A | 1/1963 | Ellis et al. |
| 3,085,530 A | 4/1963 | Williamson |
| 3,087,583 A | 4/1963 | Bruns |
| 3,107,753 A | 10/1963 | Georgette et al. |
| 3,127,958 A | 4/1964 | Szostak |
| 3,175,645 A | 3/1965 | Schafer et al. |
| 3,202,413 A | 8/1965 | Colmerauer |
| 3,206,153 A | 9/1965 | Burke |
| 3,207,270 A | 9/1965 | Ellis |
| 3,216,535 A | 11/1965 | Schultze |
| 3,238,850 A | 3/1966 | Desmarchelier |
| 3,284,076 A | 11/1966 | Gibson |
| 3,286,797 A | 11/1966 | Leibfritz et al. |
| 3,405,625 A | 10/1968 | Carlson et al. |
| 3,419,849 A | 12/1968 | Anderson et al. |
| 3,420,493 A | 1/1969 | Kraft et al. |
| 3,447,644 A | 6/1969 | Duckett |
| 3,494,606 A | 2/1970 | Hanchen |
| 3,528,700 A | 9/1970 | Janu et al. |
| 3,537,722 A | 11/1970 | Moulton |
| 3,556,137 A | 1/1971 | Billeter et al. |
| 3,559,027 A | 1/1971 | Arsem |
| 3,560,033 A | 2/1971 | Barkus |
| 3,575,442 A | 4/1971 | Elliott et al. |
| 3,584,331 A | 6/1971 | Richard et al. |
| 3,603,575 A | 9/1971 | Arlasky et al. |
| 3,605,960 A | 9/1971 | Singer |
| 3,618,972 A | 11/1971 | Buhl |
| 3,621,950 A | 11/1971 | Lutz |
| 3,650,033 A | 3/1972 | Behne et al. |
| 3,701,544 A | 10/1972 | Stankovich |
| 3,714,953 A | 2/1973 | Solvang |
| 3,750,856 A | 8/1973 | Kenworthy et al. |
| 3,784,228 A | 1/1974 | Hoffmann et al. |
| 3,791,408 A | 2/1974 | Saitou et al. |
| 3,792,644 A | 2/1974 | Ferguson et al. |
| 3,795,291 A | 3/1974 | Naito et al. |
| 3,830,482 A | 8/1974 | Norris |
| 3,842,753 A | 10/1974 | Ross et al. |
| 3,861,487 A | 1/1975 | Gill |
| 3,903,613 A | 9/1975 | Bisberg |
| 3,941,402 A | 3/1976 | Yankowski et al. |
| 3,981,204 A | 9/1976 | Starbard et al. |
| 3,981,479 A | 9/1976 | Foster et al. |
| 3,986,118 A | 10/1976 | Madigan |
| 3,995,883 A | 12/1976 | Glaze |
| 4,022,113 A | 5/1977 | Blatt et al. |
| 4,032,829 A | 6/1977 | Schenavar et al. |
| 4,036,335 A | 7/1977 | Thompson et al. |
| 4,045,008 A | 8/1977 | Bauer |
| 4,072,087 A | 2/1978 | Mueller et al. |
| 4,103,881 A | 8/1978 | Simich |
| 4,106,522 A | 8/1978 | Manesse |
| 4,114,735 A | 9/1978 | Kato |
| 4,121,610 A | 10/1978 | Harms et al. |
| 4,131,657 A | 12/1978 | Ball et al. |
| 4,139,186 A | 2/1979 | Postema et al. |
| 4,153,237 A | 5/1979 | Supalla |
| 4,159,106 A | 6/1979 | Nyman et al. |
| 4,166,612 A | 9/1979 | Freitag et al. |
| 4,174,098 A | 11/1979 | Baker et al. |
| 4,183,509 A | 1/1980 | Nishikawa et al. |
| 4,236,613 A | 12/1980 | Van Der Lely |
| 4,287,812 A | 9/1981 | Iizumi |
| 4,291,850 A | 9/1981 | Sharples |
| 4,305,566 A | 12/1981 | Grawunde |
| 4,311,302 A | 1/1982 | Heyer et al. |
| 4,333,668 A | 6/1982 | Hendrickson et al. |
| 4,334,711 A | 6/1982 | Mazur et al. |
| 4,337,850 A | 7/1982 | Shimokura et al. |
| 4,348,016 A | 9/1982 | Milly |
| 4,351,515 A | 9/1982 | Yoshida |
| 4,366,969 A | 1/1983 | Benya et al. |
| 4,387,781 A | 6/1983 | Ezell et al. |
| 4,437,548 A | 3/1984 | Ashiba et al. |
| 4,465,299 A | 8/1984 | Stone et al. |
| 4,474,363 A | 10/1984 | Numazawa et al. |
| 4,491,207 A | 1/1985 | Boonchanta et al. |
| 4,500,827 A | 2/1985 | Merritt et al. |
| 4,502,673 A | 3/1985 | Clark et al. |
| 4,529,180 A | 7/1985 | Hill |
| 4,546,959 A | 10/1985 | Tanno |
| 4,548,233 A | 10/1985 | Wolfges |
| 4,550,899 A | 11/1985 | Holley |
| 4,570,851 A | 2/1986 | Cirillo et al. |
| 4,572,317 A | 2/1986 | Isono et al. |
| 4,616,810 A | 10/1986 | Richardson et al. |
| 4,620,619 A | 11/1986 | Emura et al. |
| 4,624,346 A | 11/1986 | Katz et al. |

(56) References Cited

U.S. PATENT DOCUMENTS

| | | | |
|---|---|---|---|
| 4,630,818 A | 12/1986 | Saarinen | |
| 4,634,142 A | 1/1987 | Woods et al. | |
| 4,647,068 A | 3/1987 | Asami et al. | |
| 4,655,440 A | 4/1987 | Eckert | |
| 4,657,280 A | 4/1987 | Ohmori et al. | |
| 4,659,104 A | 4/1987 | Tanaka et al. | |
| 4,660,689 A | 4/1987 | Hayashi et al. | |
| 4,662,616 A | 5/1987 | Hennells | |
| 4,673,194 A | 6/1987 | Sugasawa | |
| 4,696,489 A | 9/1987 | Fujishiro et al. | |
| 4,709,779 A | 12/1987 | Takehara | |
| 4,723,753 A | 2/1988 | Torimoto et al. | |
| 4,729,459 A | 3/1988 | Inagaki et al. | |
| 4,732,244 A * | 3/1988 | Verkuylen | F16F 9/446 188/315 |
| 4,743,000 A | 5/1988 | Karnopp | |
| 4,744,444 A | 5/1988 | Gillingham | |
| 4,750,735 A | 6/1988 | Furgerson et al. | |
| 4,765,648 A | 8/1988 | Mander et al. | |
| 4,773,671 A | 9/1988 | Inagaki | |
| 4,786,034 A | 11/1988 | Heess et al. | |
| 4,802,561 A * | 2/1989 | Knecht | F16F 9/465 188/266.6 |
| 4,806,082 A | 2/1989 | Schenk | |
| 4,815,575 A | 3/1989 | Murty et al. | |
| 4,821,852 A | 4/1989 | Yokoya | |
| 4,826,207 A | 5/1989 | Yoshioka et al. | |
| 4,830,395 A | 5/1989 | Foley | |
| 4,836,578 A | 6/1989 | Soltis | |
| 4,838,306 A | 6/1989 | Horn et al. | |
| 4,838,394 A | 6/1989 | Lemme et al. | |
| 4,838,527 A | 6/1989 | Holley | |
| 4,846,317 A | 7/1989 | Hudgens | |
| 4,858,733 A | 8/1989 | Noguchi et al. | |
| 4,919,166 A | 4/1990 | Sims et al. | |
| 4,936,423 A | 6/1990 | Karnopp | |
| 4,936,424 A | 6/1990 | Costa | |
| 4,938,228 A | 7/1990 | Righter | |
| 4,949,262 A | 8/1990 | Buma et al. | |
| 4,949,989 A | 8/1990 | Kakizaki et al. | |
| 4,958,706 A | 9/1990 | Richardson et al. | |
| 4,972,928 A | 11/1990 | Sirven | |
| 4,975,849 A | 12/1990 | Ema et al. | |
| 4,984,819 A | 1/1991 | Kakizaki et al. | |
| 4,986,393 A | 1/1991 | Preukschat et al. | |
| 5,027,303 A | 6/1991 | Witte | |
| 5,031,455 A | 7/1991 | Cline | |
| 5,036,934 A | 8/1991 | Nishina et al. | |
| 5,040,381 A | 8/1991 | Hazen | |
| 5,044,614 A | 9/1991 | Rau | |
| 5,060,910 A | 10/1991 | Iwata et al. | |
| 5,060,959 A | 10/1991 | Davis et al. | |
| 5,072,812 A | 12/1991 | Imaizumi | |
| 5,074,624 A | 12/1991 | Stauble et al. | |
| 5,076,404 A | 12/1991 | Gustafsson | |
| 5,080,392 A | 1/1992 | Bazergui | |
| 5,094,325 A | 3/1992 | Smith | |
| 5,105,918 A | 4/1992 | Hagiwara et al. | |
| 5,113,980 A | 5/1992 | Furrer et al. | |
| 5,127,634 A | 7/1992 | Le Gourvellec | |
| 5,152,547 A | 10/1992 | Davis | |
| 5,161,653 A | 11/1992 | Hare | |
| 5,161,817 A | 11/1992 | Daum et al. | |
| 5,163,742 A | 11/1992 | Topfer et al. | |
| 5,178,242 A | 1/1993 | Nakamura et al. | |
| 5,186,481 A | 2/1993 | Turner | |
| 5,203,584 A | 4/1993 | Butsuen et al. | |
| 5,207,774 A | 5/1993 | Wolfe et al. | |
| 5,230,364 A | 7/1993 | Leng et al. | |
| 5,231,583 A | 7/1993 | Lizell | |
| 5,236,169 A | 8/1993 | Johnsen et al. | |
| 5,246,247 A | 9/1993 | Runkel | |
| 5,248,014 A | 9/1993 | Ashiba | |
| 5,259,487 A | 11/1993 | Petek et al. | |
| 5,263,559 A | 11/1993 | Mettner | |
| 5,265,902 A | 11/1993 | Lewis | |
| 5,275,086 A | 1/1994 | Stallings, Jr. | |
| 5,277,283 A | 1/1994 | Yamaoka et al. | |
| 5,283,733 A | 2/1994 | Colley | |
| 5,284,330 A | 2/1994 | Carlson et al. | |
| 5,293,971 A | 3/1994 | Kanari | |
| 5,295,074 A | 3/1994 | Williams | |
| 5,295,563 A | 3/1994 | Bennett | |
| 5,297,045 A | 3/1994 | Williams et al. | |
| 5,301,776 A | 4/1994 | Beck | |
| 5,307,907 A | 5/1994 | Nakamura et al. | |
| 5,310,203 A | 5/1994 | Chen | |
| 5,311,709 A | 5/1994 | Kobori et al. | |
| 5,318,066 A | 6/1994 | Burgorf et al. | |
| 5,328,004 A | 7/1994 | Fannin et al. | |
| 5,346,242 A | 9/1994 | Karnopp | |
| 5,347,186 A | 9/1994 | Konotchick et al. | |
| 5,348,112 A | 9/1994 | Vaillancourt | |
| 5,372,223 A | 12/1994 | Dekock et al. | |
| 5,372,224 A | 12/1994 | Samonil et al. | |
| 5,381,952 A | 1/1995 | Duprez | |
| 5,390,949 A | 2/1995 | Naganathan et al. | |
| 5,392,885 A | 2/1995 | Patzenhauer et al. | |
| 5,392,886 A | 2/1995 | Drummond | |
| 5,396,973 A | 3/1995 | Schwemmer et al. | |
| 5,398,787 A | 3/1995 | Woessner et al. | |
| 5,413,196 A | 5/1995 | Forster | |
| 5,445,366 A | 8/1995 | Shih et al. | |
| 5,467,280 A | 11/1995 | Kimura | |
| 5,480,011 A | 1/1996 | Nagai et al. | |
| 5,485,417 A | 1/1996 | Wolf et al. | |
| 5,487,006 A | 1/1996 | Kakizaki et al. | |
| 5,503,258 A | 4/1996 | Clarke et al. | |
| 5,517,898 A | 5/1996 | Kim et al. | |
| 5,542,150 A | 8/1996 | Tu | |
| 5,551,674 A | 9/1996 | Johnsen | |
| 5,553,836 A | 9/1996 | Ericson | |
| 5,558,190 A | 9/1996 | Chang | |
| 5,566,794 A | 10/1996 | Wiard | |
| 5,578,877 A | 11/1996 | Tiemann | |
| 5,586,637 A * | 12/1996 | Aidlin | B65G 47/1471 198/397.06 |
| 5,588,510 A | 12/1996 | Wilke | |
| 5,592,401 A | 1/1997 | Kramer | |
| 5,597,180 A | 1/1997 | Ganzel et al. | |
| 5,598,337 A | 1/1997 | Butsuen et al. | |
| 5,601,164 A | 2/1997 | Ohsaki et al. | |
| 5,611,413 A | 3/1997 | Feigel | |
| 5,634,563 A | 6/1997 | Peng | |
| 5,651,433 A | 7/1997 | Wirth et al. | |
| 5,657,840 A | 8/1997 | Lizell | |
| 5,687,575 A | 11/1997 | Keville et al. | |
| 5,697,477 A | 12/1997 | Hiramoto et al. | |
| 5,699,885 A | 12/1997 | Forster | |
| 5,722,645 A | 3/1998 | Reitter | |
| 5,735,372 A * | 4/1998 | Hamilton | F16F 9/46 188/266.6 |
| 5,803,443 A | 9/1998 | Chang | |
| 5,806,159 A | 9/1998 | Ohnishi et al. | |
| 5,810,128 A | 9/1998 | Eriksson et al. | |
| 5,810,384 A | 9/1998 | Iwasaki et al. | |
| 5,813,456 A | 9/1998 | Milner et al. | |
| 5,813,731 A | 9/1998 | Newman et al. | |
| 5,816,281 A | 10/1998 | Mixon | |
| 5,818,132 A | 10/1998 | Konotchick et al. | |
| 5,826,935 A | 10/1998 | Defreitas et al. | |
| 5,828,843 A | 10/1998 | Samuel et al. | |
| 5,829,733 A | 11/1998 | Becker | |
| 5,833,036 A | 11/1998 | Gillespie | |
| 5,850,352 A | 12/1998 | Moezzi et al. | |
| 5,850,896 A | 12/1998 | Tanaka | |
| 5,853,071 A | 12/1998 | Robinson | |
| 5,872,418 A | 2/1999 | Wischnewskiy | |
| 5,884,921 A | 3/1999 | Katsuda et al. | |
| 5,937,975 A | 8/1999 | Forster | |
| 5,947,238 A | 9/1999 | Jolly et al. | |
| 5,952,823 A | 9/1999 | Sprecher et al. | |
| 5,954,318 A | 9/1999 | Kluhsman | |
| 5,956,951 A | 9/1999 | O'Callaghan | |

(56) References Cited

U.S. PATENT DOCUMENTS

| | | | |
|---|---|---|---|
| 5,957,252 A | 9/1999 | Berthold |
| 5,971,116 A | 10/1999 | Franklin |
| 5,987,368 A | 11/1999 | Kamimae et al. |
| 5,988,330 A | 11/1999 | Morris |
| 5,988,655 A | 11/1999 | Sakai et al. |
| 5,992,450 A | 11/1999 | Parker et al. |
| 5,996,745 A | 12/1999 | Jones et al. |
| 5,996,746 A | 12/1999 | Turner et al. |
| 5,999,868 A | 12/1999 | Beno et al. |
| 6,000,702 A | 12/1999 | Streiter |
| 6,013,007 A | 1/2000 | Root et al. |
| 6,017,047 A | 1/2000 | Hoose |
| 6,029,958 A | 2/2000 | Larsson et al. |
| 6,035,979 A | 3/2000 | Forster |
| 6,050,583 A | 4/2000 | Bohn |
| 6,058,340 A | 5/2000 | Uchiyama et al. |
| 6,067,490 A | 5/2000 | Ichimaru et al. |
| 6,073,536 A | 6/2000 | Campbell |
| 6,073,700 A | 6/2000 | Tsuji et al. |
| 6,073,736 A | 6/2000 | Franklin |
| 6,092,011 A | 7/2000 | Hiramoto et al. |
| 6,092,816 A | 7/2000 | Sekine et al. |
| 6,105,988 A | 8/2000 | Turner et al. |
| 6,112,868 A | 9/2000 | Graham et al. |
| 6,120,049 A | 9/2000 | Gonzalez et al. |
| 6,131,709 A | 10/2000 | Jolly et al. |
| 6,135,434 A | 10/2000 | Marking |
| 6,141,969 A | 11/2000 | Launchbury et al. |
| 6,151,930 A | 11/2000 | Carlson |
| 6,152,856 A | 11/2000 | Studor et al. |
| 6,157,103 A | 12/2000 | Ohta et al. |
| 6,179,098 B1 | 1/2001 | Hayakawa et al. |
| 6,196,555 B1 | 3/2001 | Gaibler |
| 6,199,669 B1 | 3/2001 | Huang et al. |
| 6,203,026 B1 | 3/2001 | Jones |
| 6,213,263 B1 | 4/2001 | De Frenne |
| 6,215,217 B1 | 4/2001 | Kurosawa et al. |
| 6,217,049 B1 | 4/2001 | Becker |
| 6,219,045 B1 | 4/2001 | Leahy et al. |
| 6,244,398 B1 | 6/2001 | Girvin et al. |
| 6,254,067 B1 | 7/2001 | Yih |
| 6,279,702 B1 | 8/2001 | Koh |
| 6,290,034 B1 | 9/2001 | Ichimaru |
| 6,293,530 B1 | 9/2001 | Delorenzis et al. |
| 6,296,092 B1 | 10/2001 | Marking et al. |
| 6,311,962 B1 | 11/2001 | Marking |
| 6,318,525 B1 | 11/2001 | Vignocchi et al. |
| 6,321,888 B1 * | 11/2001 | Reybrouck ............ F16F 9/325 188/313 |
| 6,322,468 B1 | 11/2001 | Wing et al. |
| 6,336,648 B1 | 1/2002 | Bohn |
| 6,343,807 B1 | 2/2002 | Rathbun |
| 6,359,837 B1 | 3/2002 | Tsukamoto et al. |
| 6,360,857 B1 | 3/2002 | Fox et al. |
| 6,371,262 B1 | 4/2002 | Katou et al. |
| 6,371,267 B1 | 4/2002 | Kao et al. |
| 6,378,816 B1 | 4/2002 | Pfister |
| 6,378,885 B1 | 4/2002 | Ellsworth et al. |
| 6,382,370 B1 | 5/2002 | Girvin |
| 6,389,341 B1 | 5/2002 | Davis |
| 6,390,747 B1 | 5/2002 | Commins |
| 6,394,238 B1 | 5/2002 | Rogala |
| 6,401,883 B1 | 6/2002 | Nyce et al. |
| 6,412,788 B1 | 7/2002 | Ichimaru |
| 6,415,895 B2 | 7/2002 | Marking et al. |
| 6,418,360 B1 | 7/2002 | Spivey et al. |
| 6,427,812 B2 | 8/2002 | Crawley et al. |
| 6,434,460 B1 | 8/2002 | Uchino et al. |
| 6,446,771 B1 | 9/2002 | Sintorn et al. |
| 6,458,060 B1 | 10/2002 | Watterson et al. |
| 6,460,567 B1 | 10/2002 | Hansen et al. |
| 6,467,593 B1 | 10/2002 | Corradini et al. |
| 6,474,454 B2 | 11/2002 | Matsumoto et al. |
| 6,474,753 B1 | 11/2002 | Rieth et al. |
| 6,501,554 B1 | 12/2002 | Hackney et al. |
| 6,502,837 B1 | 1/2003 | Hamilton et al. |
| 6,510,929 B1 | 1/2003 | Gordan et al. |
| 6,520,297 B1 | 2/2003 | Lumpkin et al. |
| 6,527,093 B2 | 3/2003 | Oliver et al. |
| 6,592,136 B2 | 7/2003 | Becker et al. |
| 6,604,751 B2 | 8/2003 | Fox |
| 6,609,686 B2 | 8/2003 | Malizia |
| 6,619,615 B1 | 9/2003 | Mayr et al. |
| 6,623,389 B1 | 9/2003 | Campagnolo |
| 6,648,109 B2 | 11/2003 | Farr et al. |
| 6,651,788 B1 | 11/2003 | Wohlfarth |
| 6,659,240 B2 | 12/2003 | Dernebo |
| 6,659,241 B2 | 12/2003 | Sendrea |
| 6,672,687 B2 | 1/2004 | Nishio |
| 6,701,234 B1 | 3/2004 | Vogelsang et al. |
| 6,722,678 B2 | 4/2004 | Mcandrews |
| 6,732,033 B2 | 5/2004 | Laplante et al. |
| 6,755,113 B2 | 6/2004 | Shih |
| 6,782,980 B2 | 8/2004 | Nakadate |
| 6,817,454 B2 | 11/2004 | Nezu et al. |
| 6,837,827 B1 | 1/2005 | Lee et al. |
| 6,840,257 B2 | 1/2005 | Dario et al. |
| 6,853,955 B1 | 2/2005 | Burrell et al. |
| 6,857,625 B2 | 2/2005 | Löser et al. |
| 6,863,291 B2 | 3/2005 | Miyoshi |
| 6,883,650 B2 | 4/2005 | Van Wonderen et al. |
| 6,902,513 B1 | 6/2005 | Mcclure et al. |
| 6,905,203 B2 | 6/2005 | Kremers et al. |
| 6,920,951 B2 | 7/2005 | Song et al. |
| 6,921,351 B1 | 7/2005 | Hickman et al. |
| 6,923,853 B2 | 8/2005 | Kremers et al. |
| 6,935,157 B2 | 8/2005 | Miller |
| 6,952,060 B2 | 10/2005 | Goldner et al. |
| 6,959,906 B2 | 11/2005 | Hoenig et al. |
| 6,959,921 B2 | 11/2005 | Rose |
| 6,966,412 B2 | 11/2005 | Braswell et al. |
| 6,978,871 B2 | 12/2005 | Holiviers |
| 6,978,872 B2 | 12/2005 | Turner |
| 6,991,076 B2 | 1/2006 | Mcandrews |
| 7,025,367 B2 | 4/2006 | Mckinnon et al. |
| 7,076,351 B2 | 7/2006 | Hamilton et al. |
| 7,128,192 B2 | 10/2006 | Fox |
| 7,128,693 B2 | 10/2006 | Brown et al. |
| 7,135,794 B2 | 11/2006 | Kühnel |
| 7,147,207 B2 | 12/2006 | Jordan et al. |
| 7,163,222 B2 | 1/2007 | Becker et al. |
| 7,166,062 B1 | 1/2007 | Watterson et al. |
| 7,166,064 B2 | 1/2007 | Ashby et al. |
| 7,204,466 B2 | 4/2007 | Hsieh |
| 7,208,845 B2 | 4/2007 | Schaefer et al. |
| 7,217,224 B2 | 5/2007 | Thomas |
| 7,234,574 B2 | 6/2007 | Matsunaga et al. |
| 7,234,575 B2 | 6/2007 | Anderfaas et al. |
| 7,234,680 B2 | 6/2007 | Hull et al. |
| 7,243,763 B2 | 7/2007 | Carlson |
| 7,255,210 B2 | 8/2007 | Larsson et al. |
| 7,270,221 B2 | 9/2007 | Mcandrews |
| 7,270,222 B1 | 9/2007 | Aymar et al. |
| 7,287,760 B1 | 10/2007 | Quick et al. |
| 7,289,138 B2 | 10/2007 | Foote et al. |
| 7,292,867 B2 | 11/2007 | Werner et al. |
| 7,293,764 B2 | 11/2007 | Fang |
| 7,299,112 B2 | 11/2007 | Laplante et al. |
| 7,302,961 B2 | 12/2007 | Martin et al. |
| 7,306,206 B2 | 12/2007 | Turner |
| 7,316,406 B2 | 1/2008 | Kimura et al. |
| 7,325,660 B2 | 2/2008 | Norgaard et al. |
| 7,363,129 B1 | 4/2008 | Barnicle et al. |
| 7,374,028 B2 | 5/2008 | Fox |
| 7,397,355 B2 | 7/2008 | Tracy |
| 7,413,062 B2 | 8/2008 | Vandewal |
| 7,413,063 B1 | 8/2008 | Davis |
| 7,415,336 B1 | 8/2008 | Burch et al. |
| 7,422,092 B2 | 9/2008 | Hitchcock et al. |
| 7,441,638 B2 | 10/2008 | Hanawa |
| 7,469,910 B2 | 12/2008 | Munster et al. |
| 7,484,603 B2 | 2/2009 | Fox |
| 7,490,705 B2 | 2/2009 | Fox |
| 7,513,490 B2 | 4/2009 | Robertson |

(56) References Cited

U.S. PATENT DOCUMENTS

| | | |
|---|---|---|
| 7,523,617 B2 | 4/2009 | Colpitts et al. |
| 7,558,313 B2 | 7/2009 | Feher |
| 7,558,574 B2 | 7/2009 | Feher et al. |
| 7,566,290 B2 | 7/2009 | Lee et al. |
| 7,569,952 B1 | 8/2009 | Bono et al. |
| 7,581,743 B2 | 9/2009 | Graney et al. |
| 7,591,352 B2 | 9/2009 | Hanawa |
| 7,600,616 B2 | 10/2009 | Anderfaas et al. |
| 7,628,259 B2 | 12/2009 | Norgaard et al. |
| 7,628,414 B2 | 12/2009 | Dobson et al. |
| 7,631,882 B2 | 12/2009 | Hirao et al. |
| 7,654,369 B2 | 2/2010 | Murray et al. |
| 7,673,936 B2 | 3/2010 | Hsu et al. |
| 7,684,911 B2 | 3/2010 | Seifert et al. |
| 7,694,785 B2 | 4/2010 | Nakadate |
| 7,694,987 B2 | 4/2010 | Mcandrews |
| 7,699,753 B2 | 4/2010 | Daikeler et al. |
| 7,703,585 B2 | 4/2010 | Fox |
| 7,722,056 B2 | 5/2010 | Inoue et al. |
| 7,722,069 B2 | 5/2010 | Shirai |
| 7,726,042 B2 | 6/2010 | Meschan |
| 7,730,906 B2 | 6/2010 | Kleinert et al. |
| 7,736,272 B2 | 6/2010 | Martens |
| 7,764,990 B2 | 7/2010 | Martikka et al. |
| 7,766,794 B2 | 8/2010 | Oliver et al. |
| 7,770,701 B1 | 8/2010 | Davis |
| 7,775,128 B2 | 8/2010 | Roessingh et al. |
| 7,779,974 B2 | 8/2010 | Timoney et al. |
| 7,795,711 B2 | 9/2010 | Sauciuc et al. |
| 7,828,125 B2 | 11/2010 | Sekiya et al. |
| 7,828,126 B2 | 11/2010 | Lun |
| 7,837,213 B2 | 11/2010 | Colegrove et al. |
| 7,840,346 B2 | 11/2010 | Huhtala et al. |
| 7,841,258 B2 | 11/2010 | Komatsu et al. |
| 7,845,602 B1 | 12/2010 | Young et al. |
| 7,857,325 B2 | 12/2010 | Copsey et al. |
| 7,872,764 B2 | 1/2011 | Higgins-Luthman et al. |
| 7,874,567 B2 | 1/2011 | Ichida et al. |
| 7,901,292 B1 | 3/2011 | Uhlir et al. |
| 7,909,348 B2 | 3/2011 | Klieber et al. |
| 7,927,253 B2 | 4/2011 | Dibenedei et al. |
| 7,931,132 B2 | 4/2011 | Braun |
| 7,931,563 B2 | 4/2011 | Shaw et al. |
| 7,946,163 B2 | 5/2011 | Gartner |
| 7,975,814 B2 | 7/2011 | Soederdahl |
| 8,016,349 B2 | 9/2011 | Mouri et al. |
| 8,021,270 B2 | 9/2011 | D'Eredita |
| 8,042,427 B2 | 10/2011 | Kawakami et al. |
| 8,056,392 B2 | 11/2011 | Ryan et al. |
| 8,069,964 B2 | 12/2011 | Deferme et al. |
| 8,087,676 B2 | 1/2012 | Mcintyre |
| 8,091,910 B2 | 1/2012 | Hara et al. |
| 8,104,591 B2 | 1/2012 | Barefoot et al. |
| 8,121,757 B2 | 2/2012 | Extance et al. |
| 8,121,785 B2 | 2/2012 | Swisher et al. |
| 8,127,900 B2 | 3/2012 | Inoue |
| 8,136,877 B2 | 3/2012 | Walsh et al. |
| 8,141,438 B2 | 3/2012 | Roessingh et al. |
| 8,151,952 B2 | 4/2012 | Lenz et al. |
| 8,191,964 B2 | 6/2012 | Hsu et al. |
| 8,201,476 B2 | 6/2012 | Tsumiyama |
| 8,210,106 B2 | 7/2012 | Tai et al. |
| 8,210,330 B2 | 7/2012 | Vandewal |
| 8,246,065 B1 | 8/2012 | Kodama et al. |
| 8,256,587 B2 | 9/2012 | Bakke et al. |
| 8,256,732 B1 | 9/2012 | Young et al. |
| 8,262,058 B2 | 9/2012 | Kot |
| 8,262,062 B2 | 9/2012 | Kamo et al. |
| 8,262,100 B2 | 9/2012 | Thomas |
| 8,265,825 B2 | 9/2012 | Kajino et al. |
| 8,285,447 B2 | 10/2012 | Bennett et al. |
| 8,286,982 B2 | 10/2012 | Plantet et al. |
| 8,291,889 B2 | 10/2012 | Shafer et al. |
| 8,292,274 B2 | 10/2012 | Adoline et al. |
| 8,307,965 B2 | 11/2012 | Föster et al. |
| 8,308,124 B2 | 11/2012 | Hsu |
| 8,317,261 B2 | 11/2012 | Walsh et al. |
| 8,328,454 B2 | 12/2012 | Mcandrews et al. |
| 8,336,683 B2 | 12/2012 | Mcandrews et al. |
| 8,364,389 B2 | 1/2013 | Dorogusker et al. |
| 8,393,446 B2 | 3/2013 | Haugen |
| 8,413,773 B2 | 4/2013 | Anderfaas et al. |
| 8,423,244 B2 | 4/2013 | Proemm et al. |
| 8,430,770 B2 | 4/2013 | Dugan et al. |
| 8,458,080 B2 | 6/2013 | Shirai |
| 8,480,064 B2 | 7/2013 | Talavasek |
| 8,495,947 B2 * | 7/2013 | Hata ................ F16F 9/325 188/266.6 |
| 8,550,223 B2 | 10/2013 | Cox et al. |
| 8,550,551 B2 | 10/2013 | Shirai |
| 8,556,048 B2 | 10/2013 | Maeda et al. |
| 8,556,049 B2 | 10/2013 | Jee |
| 8,596,663 B2 | 12/2013 | Shirai et al. |
| 8,616,351 B2 | 12/2013 | Roessle et al. |
| 8,622,180 B2 | 1/2014 | Wootten et al. |
| 8,627,932 B2 | 1/2014 | Marking |
| 8,641,073 B2 | 2/2014 | Lee et al. |
| 8,651,251 B2 | 2/2014 | Preukschat et al. |
| 8,655,548 B2 | 2/2014 | Ichida et al. |
| 8,684,367 B2 | 4/2014 | Haugen |
| 8,727,947 B2 | 5/2014 | Tagliabue |
| 8,744,699 B2 | 6/2014 | Hamaguchi et al. |
| 8,752,682 B2 | 6/2014 | Park et al. |
| 8,763,770 B2 | 7/2014 | Marking |
| 8,770,357 B2 | 7/2014 | Sims et al. |
| 8,781,680 B2 | 7/2014 | Ichida et al. |
| 8,781,690 B2 | 7/2014 | Hara et al. |
| 8,814,109 B2 | 8/2014 | Laird et al. |
| 8,833,786 B2 | 9/2014 | Camp et al. |
| 8,838,335 B2 | 9/2014 | Bass et al. |
| 8,845,496 B2 | 9/2014 | Arrasvuori et al. |
| 8,857,580 B2 | 10/2014 | Marking |
| 8,868,253 B2 | 10/2014 | Hashimoto et al. |
| 8,888,115 B2 | 11/2014 | Chubbuck et al. |
| 8,935,036 B1 | 1/2015 | Christensen et al. |
| 8,936,139 B2 | 1/2015 | Galasso et al. |
| 8,950,771 B2 | 2/2015 | Felsl et al. |
| 8,955,653 B2 | 2/2015 | Marking |
| 8,967,343 B2 | 3/2015 | Battlogg et al. |
| 8,985,594 B2 | 3/2015 | Yabumoto |
| 8,991,571 B2 | 3/2015 | Murakami |
| 9,033,122 B2 | 5/2015 | Ericksen et al. |
| 9,038,791 B2 | 5/2015 | Marking |
| 9,047,778 B2 | 6/2015 | Cazanas et al. |
| 9,057,416 B2 | 6/2015 | Talavasek |
| 9,073,592 B2 | 7/2015 | Hsu |
| 9,103,400 B2 | 8/2015 | Becker |
| 9,108,098 B2 | 8/2015 | Galasso et al. |
| 9,120,362 B2 | 9/2015 | Marking |
| 9,126,647 B2 | 9/2015 | Kuo |
| 9,140,325 B2 | 9/2015 | Cox et al. |
| 9,157,523 B2 | 10/2015 | Miki et al. |
| 9,186,949 B2 | 11/2015 | Galasso et al. |
| 9,194,456 B2 | 11/2015 | Laird et al. |
| 9,199,690 B2 | 12/2015 | Watarai |
| 9,229,712 B2 | 1/2016 | Takamoto et al. |
| 9,239,090 B2 | 1/2016 | Marking et al. |
| 9,278,598 B2 | 3/2016 | Galasso et al. |
| 9,303,712 B2 | 4/2016 | Cox |
| 9,353,818 B2 | 5/2016 | Marking |
| 9,366,307 B2 | 6/2016 | Marking |
| 9,415,659 B2 | 8/2016 | Kikuchi et al. |
| 9,422,018 B2 | 8/2016 | Pelot et al. |
| 9,422,025 B2 | 8/2016 | Pezzi et al. |
| 9,452,654 B2 | 9/2016 | Ericksen et al. |
| 9,523,406 B2 | 12/2016 | Galasso et al. |
| 9,528,565 B2 | 12/2016 | Marking |
| 9,550,405 B2 | 1/2017 | Marking et al. |
| 9,556,925 B2 | 1/2017 | Marking |
| 9,616,728 B2 | 4/2017 | Marking |
| 9,650,094 B2 | 5/2017 | Laird et al. |
| 9,663,181 B2 | 5/2017 | Ericksen et al. |
| 9,682,604 B2 | 6/2017 | Cox et al. |
| 9,784,333 B2 | 10/2017 | Marking |

(56) References Cited

U.S. PATENT DOCUMENTS

| | | |
|---|---|---|
| 9,810,282 B2 | 11/2017 | Roessle et al. |
| 9,975,598 B2 | 5/2018 | Bender et al. |
| 10,029,172 B2 | 7/2018 | Galasso et al. |
| 10,036,443 B2 | 7/2018 | Galasso et al. |
| 10,040,328 B2 | 8/2018 | Marking |
| 10,040,329 B2 | 8/2018 | Ericksen et al. |
| 10,054,185 B2 | 8/2018 | Cox |
| 10,072,724 B2 | 9/2018 | Haugen et al. |
| 10,086,670 B2 | 10/2018 | Galasso et al. |
| 10,089,868 B1 | 10/2018 | Hayward |
| 10,094,443 B2 | 10/2018 | Marking |
| 10,145,435 B2 | 12/2018 | Galasso et al. |
| 10,180,171 B2 | 1/2019 | Laird et al. |
| 10,330,171 B2 | 6/2019 | Cox et al. |
| 10,336,148 B2 | 7/2019 | Ericksen et al. |
| 10,336,149 B2 | 7/2019 | Ericksen et al. |
| 10,406,883 B2 | 9/2019 | Marking |
| 10,415,662 B2 | 9/2019 | Marking |
| 10,443,671 B2 | 10/2019 | Marking |
| 10,473,179 B2 * | 11/2019 | Ripa ............... F16F 9/3488 |
| 10,550,909 B2 | 2/2020 | Haugen |
| 10,697,514 B2 | 6/2020 | Marking |
| 10,718,397 B2 | 7/2020 | Marking |
| 2001/0017334 A1 | 8/2001 | Vincent |
| 2001/0022621 A1 | 9/2001 | Squibbs |
| 2001/0030408 A1 | 10/2001 | Miyoshi et al. |
| 2001/0042663 A1 | 11/2001 | Marking et al. |
| 2001/0055373 A1 | 12/2001 | Yamashita |
| 2002/0000352 A1 | 1/2002 | Matsumoto et al. |
| 2002/0032508 A1 | 3/2002 | Uchino et al. |
| 2002/0045987 A1 | 4/2002 | Ohata et al. |
| 2002/0050112 A1 | 5/2002 | Koch et al. |
| 2002/0050518 A1 | 5/2002 | Roustaei |
| 2002/0053493 A1 | 5/2002 | Sintorn et al. |
| 2002/0055422 A1 | 5/2002 | Airmet et al. |
| 2002/0063469 A1 | 5/2002 | Nishio |
| 2002/0089107 A1 | 7/2002 | Koh |
| 2002/0095979 A1 | 7/2002 | Shirato et al. |
| 2002/0113347 A1 | 8/2002 | Robbins et al. |
| 2002/0121416 A1 | 9/2002 | Katayama et al. |
| 2002/0130000 A1 | 9/2002 | Lisenker et al. |
| 2002/0130003 A1 | 9/2002 | Lisenker et al. |
| 2002/0185581 A1 | 12/2002 | Trask et al. |
| 2002/0187867 A1 | 12/2002 | Ichida et al. |
| 2003/0001346 A1 | 1/2003 | Hamilton et al. |
| 2003/0001358 A1 | 1/2003 | Becker et al. |
| 2003/0034697 A1 | 2/2003 | Goldner et al. |
| 2003/0040348 A1 | 2/2003 | Martens et al. |
| 2003/0051954 A1 | 3/2003 | Sendrea |
| 2003/0054327 A1 | 3/2003 | Evensen et al. |
| 2003/0065430 A1 | 4/2003 | Lu et al. |
| 2003/0075403 A1 | 4/2003 | Dernebo |
| 2003/0103651 A1 | 6/2003 | Novak |
| 2003/0128275 A1 | 7/2003 | Maguire |
| 2003/0160369 A1 | 8/2003 | Laplante et al. |
| 2003/0191567 A1 | 10/2003 | Gentilcore |
| 2003/0216845 A1 | 11/2003 | Williston |
| 2004/0004659 A1 | 1/2004 | Foote et al. |
| 2004/0017455 A1 | 1/2004 | Kremers et al. |
| 2004/0021754 A1 | 2/2004 | Kremers et al. |
| 2004/0075350 A1 | 4/2004 | Kuhnel |
| 2004/0091111 A1 | 5/2004 | Levy et al. |
| 2004/0099312 A1 | 5/2004 | Boyer et al. |
| 2004/0103146 A1 | 5/2004 | Park |
| 2004/0172178 A1 | 9/2004 | Takeda et al. |
| 2004/0208687 A1 | 10/2004 | Sicz et al. |
| 2004/0220708 A1 | 11/2004 | Owen et al. |
| 2004/0220712 A1 | 11/2004 | Takeda et al. |
| 2004/0222056 A1 | 11/2004 | Fox |
| 2004/0256778 A1 | 12/2004 | Verriet |
| 2005/0055156 A1 | 3/2005 | Maltagliati et al. |
| 2005/0056507 A1 | 3/2005 | De Molina et al. |
| 2005/0077131 A1 | 4/2005 | Russell |
| 2005/0098401 A1 | 5/2005 | Hamilton et al. |
| 2005/0104320 A1 | 5/2005 | Wesling et al. |
| 2005/0107216 A1 | 5/2005 | Lee et al. |
| 2005/0110229 A1 | 5/2005 | Kimura et al. |
| 2005/0121269 A1 | 6/2005 | Namuduri |
| 2005/0173849 A1 | 8/2005 | Vandewal |
| 2005/0195094 A1 | 9/2005 | White |
| 2005/0199455 A1 | 9/2005 | Browne et al. |
| 2005/0216186 A1 | 9/2005 | Dorfman et al. |
| 2005/0227798 A1 | 10/2005 | Ichida et al. |
| 2005/0239601 A1 | 10/2005 | Thomas |
| 2005/0288154 A1 | 12/2005 | Lee et al. |
| 2006/0040793 A1 | 2/2006 | Martens et al. |
| 2006/0064223 A1 | 3/2006 | Voss |
| 2006/0065496 A1 | 3/2006 | Fox |
| 2006/0066074 A1 | 3/2006 | Turner et al. |
| 2006/0076757 A1 | 4/2006 | Bromley |
| 2006/0081431 A1 | 4/2006 | Breese et al. |
| 2006/0096817 A1 | 5/2006 | Norgaard et al. |
| 2006/0113834 A1 | 6/2006 | Hanawa |
| 2006/0124414 A1 | 6/2006 | Hanawa |
| 2006/0136173 A1 | 6/2006 | Case et al. |
| 2006/0137934 A1 | 6/2006 | Kurth |
| 2006/0163551 A1 | 7/2006 | Coenen et al. |
| 2006/0163787 A1 | 7/2006 | Munster et al. |
| 2006/0175792 A1 | 8/2006 | Sicz et al. |
| 2006/0176216 A1 | 8/2006 | Hipskind |
| 2006/0185951 A1 | 8/2006 | Tanaka |
| 2006/0213082 A1 | 9/2006 | Meschan |
| 2006/0219503 A1 | 10/2006 | Kim |
| 2006/0225976 A1 | 10/2006 | Nakadate |
| 2006/0231359 A1 | 10/2006 | Matsunaga et al. |
| 2006/0237272 A1 | 10/2006 | Huang |
| 2006/0253210 A1 | 11/2006 | Rosenberg |
| 2006/0254365 A1 | 11/2006 | Hamel |
| 2006/0289258 A1 | 12/2006 | Fox |
| 2007/0006489 A1 | 1/2007 | Case et al. |
| 2007/0007743 A1 | 1/2007 | Becker et al. |
| 2007/0008096 A1 | 1/2007 | Tracy |
| 2007/0021885 A1 | 1/2007 | Soehren |
| 2007/0032981 A1 | 2/2007 | Merkel et al. |
| 2007/0034464 A1 | 2/2007 | Barefoot |
| 2007/0039790 A1 | 2/2007 | Timoney et al. |
| 2007/0051573 A1 | 3/2007 | Norgaard et al. |
| 2007/0070069 A1 | 3/2007 | Samarasekera et al. |
| 2007/0080515 A1 | 4/2007 | Mcandrews et al. |
| 2007/0088475 A1 | 4/2007 | Nordgren et al. |
| 2007/0090518 A1 | 4/2007 | Sauciuc et al. |
| 2007/0119669 A1 | 5/2007 | Anderfaas et al. |
| 2007/0170688 A1 | 7/2007 | Watson |
| 2007/0199401 A1 | 8/2007 | Kawakami et al. |
| 2007/0213126 A1 | 9/2007 | Deutsch et al. |
| 2007/0239479 A1 | 10/2007 | Arrasvuori et al. |
| 2007/0272458 A1 | 11/2007 | Taniguchi et al. |
| 2008/0006494 A1 | 1/2008 | Vandewal |
| 2008/0009992 A1 | 1/2008 | Izawa et al. |
| 2008/0015089 A1 | 1/2008 | Hurwitz et al. |
| 2008/0018065 A1 | 1/2008 | Hirao et al. |
| 2008/0029730 A1 | 2/2008 | Kamo et al. |
| 2008/0041677 A1 | 2/2008 | Namuduri |
| 2008/0059025 A1 | 3/2008 | Furuichi et al. |
| 2008/0067019 A1 | 3/2008 | Jensen et al. |
| 2008/0093820 A1 | 4/2008 | Mcandrews |
| 2008/0096726 A1 | 4/2008 | Riley et al. |
| 2008/0099968 A1 | 5/2008 | Schroeder |
| 2008/0109158 A1 | 5/2008 | Huhtala et al. |
| 2008/0116622 A1 | 5/2008 | Fox |
| 2008/0119330 A1 | 5/2008 | Chiang et al. |
| 2008/0163718 A1 | 7/2008 | Chiang |
| 2008/0185244 A1 | 8/2008 | Maeda et al. |
| 2008/0200310 A1 | 8/2008 | Tagliabue |
| 2008/0250844 A1 | 10/2008 | Gartner |
| 2008/0254944 A1 | 10/2008 | Muri et al. |
| 2008/0303320 A1 | 12/2008 | Schranz et al. |
| 2008/0312799 A1 | 12/2008 | Miglioranza |
| 2008/0314706 A1 | 12/2008 | Lun et al. |
| 2009/0000885 A1 | 1/2009 | Mcandrews |
| 2009/0001684 A1 | 1/2009 | Mcandrews et al. |
| 2009/0020382 A1 | 1/2009 | Van Weelden et al. |
| 2009/0038897 A1 | 2/2009 | Murakami |
| 2009/0048070 A1 | 2/2009 | Vincent et al. |

(56) References Cited

U.S. PATENT DOCUMENTS

| | | |
|---|---|---|
| 2009/0069972 A1 | 3/2009 | Templeton et al. |
| 2009/0070037 A1 | 3/2009 | Templeton et al. |
| 2009/0071772 A1 | 3/2009 | Cho et al. |
| 2009/0071773 A1 | 3/2009 | Lun |
| 2009/0098981 A1 | 4/2009 | Del et al. |
| 2009/0118100 A1 | 5/2009 | Oliver et al. |
| 2009/0121398 A1 | 5/2009 | Inoue |
| 2009/0131224 A1 | 5/2009 | Yuen |
| 2009/0138157 A1 | 5/2009 | Hagglund et al. |
| 2009/0140501 A1 | 6/2009 | Taylor et al. |
| 2009/0171532 A1 | 7/2009 | Ryan et al. |
| 2009/0192673 A1 | 7/2009 | Song et al. |
| 2009/0200126 A1 | 8/2009 | Kondo et al. |
| 2009/0236807 A1 | 9/2009 | Wootten et al. |
| 2009/0258710 A1 | 10/2009 | Quatrochi et al. |
| 2009/0261542 A1 | 10/2009 | Mcintyre |
| 2009/0277736 A1 | 11/2009 | Mcandrews et al. |
| 2009/0288924 A1 | 11/2009 | Murray et al. |
| 2009/0294231 A1 | 12/2009 | Carlson et al. |
| 2009/0302558 A1 | 12/2009 | Shirai |
| 2009/0314592 A1 | 12/2009 | Nygren |
| 2009/0324327 A1 | 12/2009 | Mcandrews et al. |
| 2010/0004097 A1 | 1/2010 | D'Eredita |
| 2010/0010709 A1 | 1/2010 | Song |
| 2010/0032254 A1 | 2/2010 | Anderfaas et al. |
| 2010/0044975 A1 | 2/2010 | Yablon et al. |
| 2010/0059964 A1 | 3/2010 | Morris |
| 2010/0066051 A1 | 3/2010 | Haugen |
| 2010/0109277 A1 | 5/2010 | Furrer |
| 2010/0133764 A1 | 6/2010 | Greaves |
| 2010/0139442 A1 | 6/2010 | Miyama |
| 2010/0147640 A1 | 6/2010 | Jones et al. |
| 2010/0160014 A1 | 6/2010 | Galasso et al. |
| 2010/0170760 A1 | 7/2010 | Marking |
| 2010/0186836 A1 | 7/2010 | Yoshihiro et al. |
| 2010/0198453 A1 | 8/2010 | Dorogusker et al. |
| 2010/0207351 A1 | 8/2010 | Klieber et al. |
| 2010/0224454 A1 | 9/2010 | Chen et al. |
| 2010/0244340 A1 | 9/2010 | Wootten et al. |
| 2010/0252972 A1 | 10/2010 | Cox et al. |
| 2010/0276238 A1 | 11/2010 | Crasset |
| 2010/0276906 A1 | 11/2010 | Galasso et al. |
| 2010/0308628 A1 | 12/2010 | Hsu et al. |
| 2010/0314917 A1 | 12/2010 | Hsieh et al. |
| 2010/0324781 A1 | 12/2010 | Gagliano |
| 2010/0326780 A1 | 12/2010 | Murakami |
| 2010/0327542 A1 | 12/2010 | Hara et al. |
| 2011/0022266 A1 | 1/2011 | Ippolito et al. |
| 2011/0067965 A1 | 3/2011 | Mcandrews |
| 2011/0086686 A1 | 4/2011 | Avent et al. |
| 2011/0095507 A1 | 4/2011 | Planiei et al. |
| 2011/0097139 A1 | 4/2011 | Hsu et al. |
| 2011/0109060 A1 | 5/2011 | Earle et al. |
| 2011/0127706 A1 | 6/2011 | Sims et al. |
| 2011/0174582 A1 | 7/2011 | Wootten et al. |
| 2011/0202236 A1 | 8/2011 | Galasso et al. |
| 2011/0204201 A1 | 8/2011 | Kodama et al. |
| 2011/0214956 A1 | 9/2011 | Marking |
| 2011/0257848 A1 | 10/2011 | Shirai |
| 2011/0284333 A1 | 11/2011 | Krog et al. |
| 2011/0315494 A1 | 12/2011 | Marking |
| 2012/0006949 A1 | 1/2012 | Laird et al. |
| 2012/0007327 A1 | 1/2012 | Talavasek |
| 2012/0018263 A1 | 1/2012 | Marking |
| 2012/0018264 A1 | 1/2012 | King |
| 2012/0048665 A1 | 3/2012 | Marking |
| 2012/0074660 A1 | 3/2012 | Thomas |
| 2012/0080279 A1 | 4/2012 | Galasso et al. |
| 2012/0136537 A1 | 5/2012 | Galasso et al. |
| 2012/0181126 A1 | 7/2012 | De Kock |
| 2012/0222927 A1 | 9/2012 | Marking |
| 2012/0228906 A1 | 9/2012 | Mcandrews et al. |
| 2012/0253599 A1 | 10/2012 | Shirai |
| 2012/0253600 A1 | 10/2012 | Ichida et al. |
| 2012/0274043 A1 | 11/2012 | Lee et al. |
| 2012/0305350 A1 | 12/2012 | Ericksen et al. |
| 2012/0312648 A1 | 12/2012 | Yu et al. |
| 2013/0001030 A1 | 1/2013 | Goldasz et al. |
| 2013/0037361 A1 | 2/2013 | Park et al. |
| 2013/0090195 A1 | 4/2013 | Hamaguchi et al. |
| 2013/0119634 A1 | 5/2013 | Camp et al. |
| 2013/0144489 A1 | 6/2013 | Galasso et al. |
| 2013/0168195 A1 | 7/2013 | Park et al. |
| 2013/0220110 A1 | 8/2013 | Zhan et al. |
| 2013/0221713 A1 | 8/2013 | Pelot et al. |
| 2013/0292218 A1 | 11/2013 | Ericksen et al. |
| 2013/0333993 A1 | 12/2013 | Yu |
| 2014/0008160 A1 | 1/2014 | Marking et al. |
| 2014/0027219 A1 | 1/2014 | Marking et al. |
| 2014/0048365 A1 | 2/2014 | Kim |
| 2014/0061419 A1 | 3/2014 | Wehage et al. |
| 2015/0073656 A1 | 3/2015 | Takamoto et al. |
| 2015/0081171 A1* | 3/2015 | Ericksen ............... B60G 17/08 701/37 |
| 2015/0141056 A1 | 5/2015 | Fefilatyev et al. |
| 2015/0175236 A1 | 6/2015 | Walthert et al. |
| 2015/0179062 A1 | 6/2015 | Ralston et al. |
| 2015/0191069 A1* | 7/2015 | Zuleger ............... B60G 17/08 280/124.16 |
| 2015/0197308 A1 | 7/2015 | Butora et al. |
| 2015/0233442 A1 | 8/2015 | Noguchi |
| 2015/0291248 A1 | 10/2015 | Fukao et al. |
| 2016/0025178 A1 | 1/2016 | Kamakura et al. |
| 2016/0031506 A1 | 2/2016 | Lloyd et al. |
| 2016/0076617 A1 | 3/2016 | Marking |
| 2016/0153515 A1 | 6/2016 | Ebersbach et al. |
| 2016/0153516 A1 | 6/2016 | Marking |
| 2016/0185178 A1 | 6/2016 | Galasso et al. |
| 2016/0200164 A1 | 7/2016 | Tabata et al. |
| 2016/0265615 A1 | 9/2016 | Marking |
| 2016/0290431 A1 | 10/2016 | Marking |
| 2016/0319899 A1 | 11/2016 | Franklin et al. |
| 2016/0355226 A1 | 12/2016 | Pelot et al. |
| 2016/0364989 A1 | 12/2016 | Speasl et al. |
| 2017/0008363 A1 | 1/2017 | Ericksen et al. |
| 2017/0136843 A1 | 5/2017 | Marking |
| 2017/0184174 A1 | 6/2017 | Marking |
| 2017/0247072 A1 | 8/2017 | Laird et al. |
| 2017/0259876 A1 | 9/2017 | Ericksen et al. |
| 2017/0282669 A1 | 10/2017 | Cox et al. |
| 2017/0291466 A1 | 10/2017 | Tong |
| 2018/0010666 A1 | 1/2018 | Marking |
| 2018/0031071 A1 | 2/2018 | Marking |
| 2018/0118302 A1 | 5/2018 | Fukao et al. |
| 2018/0150764 A1 | 5/2018 | Stenneth |
| 2018/0174446 A1 | 6/2018 | Wang |
| 2018/0222541 A1 | 8/2018 | Madau et al. |
| 2018/0304149 A1 | 10/2018 | Galasso et al. |
| 2018/0326805 A1 | 11/2018 | Marking |
| 2018/0326808 A1 | 11/2018 | Ericksen et al. |
| 2018/0328442 A1 | 11/2018 | Galasso et al. |
| 2018/0328446 A1 | 11/2018 | Ericksen et al. |
| 2018/0334007 A1 | 11/2018 | Ericksen et al. |
| 2018/0334008 A1 | 11/2018 | Ericksen et al. |
| 2018/0335102 A1 | 11/2018 | Haugen |
| 2018/0339565 A1 | 11/2018 | Ericksen et al. |
| 2018/0339566 A1 | 11/2018 | Ericksen et al. |
| 2018/0339567 A1 | 11/2018 | Ericksen et al. |
| 2018/0355943 A1 | 12/2018 | Cox |
| 2018/0355946 A1 | 12/2018 | Ericksen et al. |
| 2019/0030975 A1 | 1/2019 | Galasso et al. |
| 2019/0031264 A1 | 1/2019 | Laird et al. |
| 2019/0032745 A1 | 1/2019 | Marking |
| 2019/0154100 A1* | 5/2019 | Coaplen ............... F16F 9/464 |
| 2019/0176557 A1 | 6/2019 | Marking et al. |
| 2019/0184782 A1 | 6/2019 | Shaw et al. |
| 2019/0203798 A1 | 7/2019 | Cox et al. |
| 2019/0247744 A1 | 8/2019 | Galasso et al. |
| 2020/0191227 A1 | 6/2020 | Laird |

FOREIGN PATENT DOCUMENTS

| | | | |
|---|---|---|---|
| DE | 3532292 | A1 | 3/1987 |
| DE | 3536655 | A1 | 4/1987 |

(56) References Cited

FOREIGN PATENT DOCUMENTS

| | | | |
|---|---|---|---|
| DE | 3709447 A1 | 10/1988 |
| DE | 3711442 A1 | 10/1988 |
| DE | 3738048 A1 | 5/1989 |
| DE | 3924166 C1 | 2/1991 |
| DE | 4022099 C1 | 12/1991 |
| DE | 4029090 A1 | 3/1992 |
| DE | 4406918 A1 | 9/1994 |
| DE | 202004005229 U1 | 8/2004 |
| DE | 10326675 A1 | 12/2004 |
| DE | 102005025811 A1 | 12/2006 |
| DE | 102007063365 A1 | 7/2009 |
| DE | 202008015968 U1 | 4/2010 |
| DE | 202010012738 U1 | 12/2010 |
| EP | 207409 A2 | 1/1987 |
| EP | 304801 A2 | 3/1989 |
| EP | 0403803 A1 | 12/1990 |
| EP | 552568 A1 | 7/1993 |
| EP | 0735280 A2 | 10/1996 |
| EP | 1050696 A2 | 11/2000 |
| EP | 1138530 A2 | 10/2001 |
| EP | 1188661 A2 | 3/2002 |
| EP | 1241087 A1 | 9/2002 |
| EP | 1355209 A1 | 10/2003 |
| EP | 1394439 A1 | 3/2004 |
| EP | 1449688 A2 | 8/2004 |
| EP | 1623856 A2 | 2/2006 |
| EP | 1757473 A2 | 2/2007 |
| EP | 1825220 A2 | 8/2007 |
| EP | 2103512 A2 | 9/2009 |
| EP | 2116739 A2 | 11/2009 |
| EP | 2189191 A2 | 5/2010 |
| EP | 2248691 A1 | 11/2010 |
| EP | 2357098 A2 | 8/2011 |
| EP | 2410203 A2 | 1/2012 |
| EP | 2479095 A2 | 7/2012 |
| EP | 2495472 A2 | 9/2012 |
| EP | 2357098 B1 | 10/2014 |
| EP | 2848582 A1 | 3/2015 |
| EP | 3786049 A1 | 3/2021 |
| FR | 1343760 A | 11/1963 |
| FR | 2432424 A1 | 2/1980 |
| FR | 2449236 A1 | 9/1980 |
| FR | 2529002 A2 | 12/1983 |
| FR | 2617928 A1 | 1/1989 |
| FR | 2952031 A1 | 5/2011 |
| GB | 806307 A | 12/1958 |
| GB | 1185074 A | 3/1970 |
| GB | 2104183 A | 3/1983 |
| GB | 2159234 A | 11/1985 |
| GB | 2159604 A | 12/1985 |
| GB | 2180320 A | 3/1987 |
| GB | 2289111 A | 11/1995 |
| JP | 57173632 A | 10/1982 |
| JP | 57173632 U | 11/1982 |
| JP | 57182506 A | 11/1982 |
| JP | 01106721 A | 4/1989 |
| JP | H0193637 A | 4/1989 |
| JP | H02168038 A | 6/1990 |
| JP | H03113139 A | 5/1991 |
| JP | 04203540 A | 7/1992 |
| JP | 05149364 A | 6/1993 |
| JP | 06101735 A | 4/1994 |
| JP | 06185562 A | 7/1994 |
| JP | H084818 A | 1/1996 |
| JP | 2005119548 A | 5/2005 |
| JP | 2005119549 A | 5/2005 |
| JP | 2007302211 A | 11/2007 |
| JP | 2008238921 A | 10/2008 |
| KR | 20070076226 A | 7/2007 |
| KR | 20100041679 A | 4/2010 |
| RU | 2469224 C1 | 12/2012 |
| WO | 9840231 A2 | 9/1998 |
| WO | 99/06231 | 2/1999 |
| WO | 0027658 A1 | 5/2000 |
| WO | 03070546 A1 | 8/2003 |
| WO | 2007017739 A2 | 2/2007 |
| WO | 2007117884 A2 | 10/2007 |
| WO | 2008086605 A1 | 7/2008 |
| WO | 2008114445 A1 | 9/2008 |
| WO | 2013066159 A1 | 5/2013 |

OTHER PUBLICATIONS

European Search Report for European Application No. 19206334.5, 6 pages, dated May 12, 2020 (May 12, 2020).
European Search Report for European Application No. 19212356.0, 8 pages, dated May 7, 2020 (May 7, 2020).
Machine translation DE3613386; Oct. 1986.
Machine translation EP 0403803; Dec. 1990.
Machine translation KR20100041679; Apr. 2010.
European Search Report for European Application No. 19157767, dated Oct. 16, 2019, 9 Pages.
EP Search Report for European Application No. 21173940.4, dated Nov. 12, 2021, 9 Pages.
European Search Report for European Application No. 20187747, dated Nov. 18, 2020, 11 Pages.
Fachkunde Fahrradtechnik 4 Auflage, Gressmann_Inhaltv und S, 2011, 206-207.
Statement of Grounds of Appeal, EP App. No. 11153607.4, dated May 28, 2018, 88 Pages.
Grounds of Appeal, EP App. No. 11153607.4, dated Jun. 1, 2018, 28 Pages.
"17 Years of Innovation and Still Evolving", https://www.powertap.com/post/blog-15-17-years-of-innovation-and-still-evolving, Nov. 28, 2018, 8 Pages.
"ANT Message Protocol and Usage", Dynastream Innovations, Inc., Jul. 2, 2007, 68 Pages.
"Basis for Claims Filed Jan. 23, 2015", European Patent Application No. 14189773.6, 2 Pages.
"Communication Re Oral Proceedings for European Application No. 10161906, dated Feb. 15, 2013 (Feb. 13, 2015)".
"European Search Report for European Application No. 09159949, 2 pages, dated Sep. 11, 2017 (Sep. 11, 2017)".
"European Search Report for European Application No. 09177128, 4 pages, dated Aug. 25, 2010 (Aug. 25, 2010)".
"European Search Report for European Application No. 10161906, 3 pages, dated Sep. 15, 2010 (Sep. 15, 2010)".
"European Search Report for European Application No. 10187320, 12 pages, dated Sep. 25, 2017 (Sep. 25, 2017)".
"European Search Report for European Application No. 11153607, 3 pages, dated Aug. 10, 2012 (Aug. 10, 2012))".
"European Search Report for European Application No. 11172553, 2 pages, dated Sep. 25, 2017 (Sep. 25, 2017)".
"European Search Report for European Application No. 11172612, 2 pages, dated Oct. 6, 2011 (Oct. 6, 2011))".
"European Search Report for European Application No. 11175126, 2 pages, dated Sep. 25, 2017 (Sep. 25, 2017)".
"European Search Report for European Application No. 11275170, 2 pages, dated Jan. 10, 2018 (Jan. 10, 2018)".
"European Search Report for European Application No. 12170370, 2 pages, dated Nov. 15, 2017 (Nov. 15, 2017)".
"European Search Report for European Application No. 12184150, 10 pages, dated Dec. 12, 2017 (Dec. 12, 2017)".
"European Search Report for European Application No. 13158034, 4 pages, dated Jun. 28, 2013 (Jun. 28, 2013))".
"European Search Report for European Application No. 13174817.0, 13 pages, dated Jan. 8, 2018 (Jan. 8, 2018))".
"European Search Report for European Application No. 13189574, 2 pages, dated Feb. 19, 2014 (Feb. 19, 2014)".
"European Search Report for European Application No. 15167426, 4 pages, dated Sep. 18, 2015 (Sep. 18, 2015))".
"European Search Report for European Application No. 16167306, 2 pages, dated Mar. 23, 2017 (Mar. 23, 2017)".
"European Search Report for European Application No. 17154191, 2 pages, dated Jun. 28, 2017 (Jun. 28, 2017)".
"European Search Report for European Application No. 17188022, 9 pages, dated Feb. 1, 2018 (Feb. 1, 2018))".

(56) References Cited

OTHER PUBLICATIONS

"European Search Report for EP Application No. 18154672, 3 pages, dated Aug. 28, 2018 (Aug. 28, 2018))".
"Notice of Intent to Grant EP Application 09159949.8 dated Nov. 14, 2019, pp. 48".
"Office Action for European Application No. 13158034.2, 5 pages, dated May 22, 2014".
"The Lee Company Technical Hydraulic Handbook", 1996, 1-696.
Healey, "The Tyre as Part of the Suspension System", The Institution of Automobile Engineers, Nov. 1924, 26-128.
Kasprzak, "Understanding Your Dampers: A guide from Jim Kasprzak", http://www.kaztechnologies.com/downloads/kaz-tech-tips/ Accessed: Oct. 24, 2018, 25 pages.
Litchfield, "Pneumatic Tires", Transactions (Society of Automobile Engineers), vol. 8, Part II, 1913, 208-223.
Puhn, "How to Make Your Car Handle", HPBooks, 1981, 7 Pages.
Shiozaki, et al., "SP-861-Vehicle Dynamics and Electronic Controlled Suspensions SAE Technical Paper Series No. 910661", International Congress and Exposition, Detroit, Mich., Feb. 25-Mar. 1, 1991.
Smith, ""The Bump Stop" in Engineer to win—Chapter 13: Springs and Shock Absorbers", MBI Publishing Company and Motorbooks, USA XP055430818, ISBN: 978-0-87938-186-8, Dec. 31, 1984, 207.
Waechter, et al., "A Multibody Model for the Simulation of Bicycle Suspension Systems", Vehicle System Dynamics, vol. 37, No. 1, 2002, 3-28.
Electronic Translation of DE3709447A1.
English language abstract for EP 0207409 (no date).
European Search Report, European Patent Application No. 14189773.6, dated May 4, 2015, 4 Pages.
EP Search Report for European Application No. 15163428.4, dated Jul. 3, 2017, 7 Pages.
"European Patent Office Final Decision dated Mar. 21, 2013", European Patent Application No. 10161906.2.
"European Search Report and Written Opinion, European Patent Application No. 13165362.8", dated Sep. 24, 2014, 6 Pages.

\* cited by examiner

ELECTRONIC COMPRESSION AND REBOUND CONTROL

CROSS-REFERENCE TO RELATED APPLICATIONS

This application claims priority to and is a continuation of the co-pending patent application having application Ser. No. 15/482,507, filed on Apr. 7, 2017, entitled "ELECTRONIC COMPRESSION AND REBOUND CONTROL" by Ivan Tong, assigned to the assignee of the present application and is hereby incorporated by reference in its entirety herein.

The application with Ser. No. 15/482,507 claims the benefit of and claims priority of U.S. provisional patent application Ser. No. 62/320,368, filed on Apr. 8, 2016, entitled "SINGLE VALVED TAILORED ELECTRONIC COMPRESSION AND REBOUND CONTROL" by Ivan Tong, assigned to the assignee of the present application and is hereby incorporated by reference in its entirety herein.

BACKGROUND

Field of the Invention

Embodiments generally relate to a damper assembly for a vehicle. More specifically, the invention relates to an adjustable damper for use with a vehicle suspension.

Description of the Related Art

Vehicle suspension systems typically include a spring component or components and a dampening component or components. Typically, mechanical springs, like helical springs are used with some type of viscous fluid-based dampening mechanism and the two are mounted functionally in parallel. In some instances, a spring may comprise pressurized gas and features of the damper or spring are user-adjustable, such as by adjusting the air pressure in a gas spring. A damper may be constructed by placing a damping piston in a fluid-filled cylinder (e.g., liquid such as oil). As the damping piston is moved in the cylinder, fluid is compressed and passes from one side of the piston to the other side. Often, the piston includes vents there through which may be covered by shim stacks to provide for different operational characteristics in compression or extension.

Conventional damping components provide a constant damping rate during compression or extension through the entire length of the stroke. Other conventional damping components provide mechanisms for varying the damping rate. Further, in the world of bicycles, damping components are most prevalently mechanical. As various types of recreational and sporting vehicles continue to become more technologically advanced, what is needed in the art are improved techniques for varying the damping rate.

BRIEF DESCRIPTION OF THE DRAWINGS

Aspects of the present invention are illustrated by way of example, and not by way of limitation, in the accompanying drawings, wherein.

Figure 1:
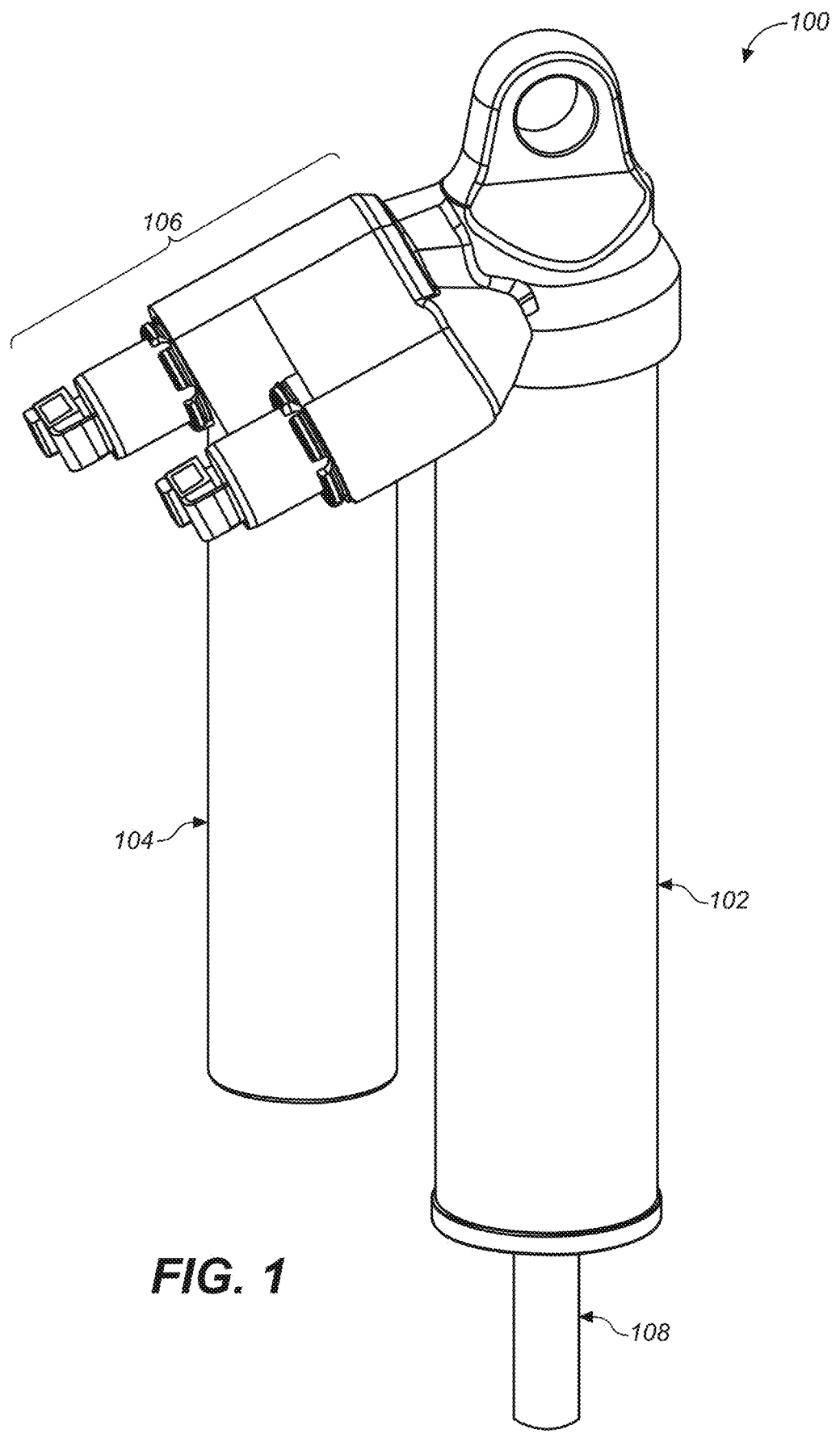
FIG. 1 is a perspective view of a vehicle suspension damper including an electronic valve assembly, in accordance with an embodiment of the present invention.

The drawings referred to in this description should be understood as not being drawn to scale except if specifically noted.

DESCRIPTION OF EMBODIMENTS

The detailed description set forth below in connection with the appended drawings is intended as a description of various embodiments of the present invention and is not intended to represent the only embodiments in which the present invention may be practiced. Each embodiment described in this disclosure is provided merely as an example or illustration of the present invention, and should not necessarily be construed as preferred or advantageous over other embodiments. In some instances, well known methods, procedures, objects, and circuits have not been described in detail as not to unnecessarily obscure aspects of the present disclosure.

Notation and Nomenclature

Unless specifically stated otherwise as apparent from the following discussions, it is appreciated that throughout the present Description of Embodiments, discussions utilizing terms such as "sensing" or the like, often refer to the actions and processes of a computer system or similar electronic computing device (or portion thereof) such as, but not limited to, a control system. (See FIG. 7) The electronic computing device manipulates and transforms data represented as physical (electronic) quantities within the electronic computing device's processors, registers, and/or memories into other data similarly represented as physical quantities within the electronic computing device's memories, registers and/or other such information storage, processing, transmission, and/or display components of the electronic computing device or other electronic computing device(s). Under the direction of computer-readable instructions, the electronic computing device may carry out operations of one or more of the methods described herein.

Overview of Discussion

As is generally known, shock absorbers, may be applied to single or multi-wheeled vehicles. These shock absorbers may include an electronic valve or a plurality of electronic valves. Sensors may be attached to the vehicle and provide information, to a control system attached to the electronic valve, on acceleration (with respect to a bicycle), and on acceleration, tilt, velocity and position (with respect to vehicles with more than two wheels). The control system accesses the sensor signals and actuates the electronic valve to provide variable damping. A detailed description of electronic valves and corresponding control of vehicle suspension dampers is found in U.S. Pat. No. 9,452,654 entitled "Method and Apparatus for An Adjustable Damper" dated Sep. 27, 2016 which is assigned to the assignee of the present application, and which is hereby incorporated by reference in its entirety herein.

Example conventional and novel techniques, systems, and methods for controlling vehicle motion are described herein. Herein, a novel electronic valve assembly and its functioning is described. This novel electronic valve assembly is not only utilized to perform the conventional methods for controlling a vehicle's motion, but also novel methods for controlling a vehicle's motion by enabling even more selective damping to occur.

Figure 2:
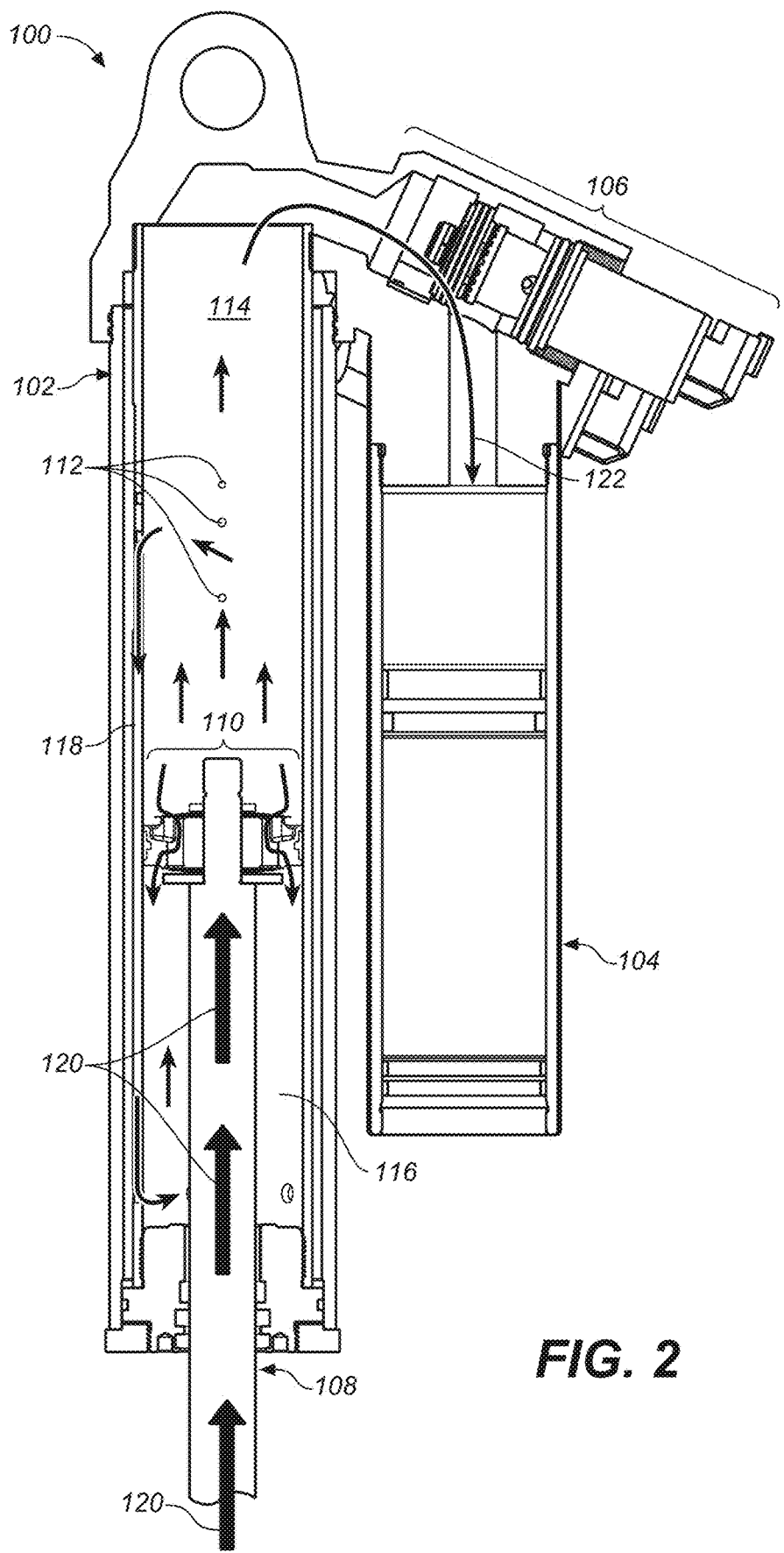
FIG. 2 is a cut-away view of a vehicle suspension damper depicted during compression, in accordance with an embodiment of the present invention.

Detailed Description of the Present Electronic Valve Assembly and Operation Thereof FIG. 1 is a perspective view of a vehicle suspension damper 100. As shown in FIG. 1, vehicle suspension damper 100 includes a damping cylinder 102 and a reservoir chamber 104 in fluid communication with damping cylinder 102. Vehicle suspension damper 100 also includes an electronic valve assembly 106. FIG. 1 also includes a piston shaft 108 which can move telescopically with respect to damping cylinder 102. Although the present embodiment specifically refers to a twin-tube vehicle suspension damper, embodiments of the present invention are also well-suited to use with other types of vehicle suspension dampers including, but not limited to, a monotube vehicle suspension damper Referring now to FIG. 2, a cut-away view of vehicle suspension damper 100 is shown. As shown in FIG. 2, vehicle suspension damper 100 includes a damping piston 110 coupled to piston shaft 108. Damping cylinder 102 includes an annular chamber 118 which surrounds the interior chamber in which damping piston 110 travels. In the embodiment of FIG. 2, damping cylinder 102 includes bypass openings (typically shown as 112) which fluidically couple the interior of damping cylinder 102 with annular chamber 118. It will be understood that bypass openings 112 in combination with annular chamber 118 are utilized to achieve position dependent damping in vehicle suspension damper 100. Additionally, in some embodiments of the present invention, damping piston 110 will have valving therein to allow fluid to pass through damping piston 110 during compression movement (i.e. motion of piston shaft 108 and damping piston 110 into damping cylinder 102 as shown by arrows 120).

Referring still to FIG. 2, as is typically understood, damping piston 110 at least partially defines a compression region 114 residing above damping piston 110. Similarly, damping piston 110 also at least partially defines a rebound region 116 residing below damping piston 110. It will be understood that the volume of compression region 114 will vary as the position of damping piston 110 changes within damping cylinder 102. Similarly, it will be understood that the volume of rebound region 116 will vary as the position of damping piston 110 changes within damping cylinder 102. Moreover, it will be understood that compression region 114 and/or rebound region 116 may also be defined as including at least a portion of annular chamber 118 depending upon the state (compression or rebound) of vehicle suspension damper 100.

Referring again to FIG. 2, during compression of vehicle suspension damper 100, fluid will typically flow from above damping piston 110 into bypass openings 112, through annular chamber 118 and ultimately into rebound region 116 beneath damping piston 110. Additionally, in some embodiments, during compression, fluid will also pass from compression region 114 to rebound region 116 by passing through valving in damping piston 110. As piston shaft 108 enters damping cylinder 102, fluid is displaced by the additional volume of piston shaft 108 which enters damping cylinder 102. The fluid displaced by piston shaft 108 is referred to as shaft displaced fluid.

Figure 3:
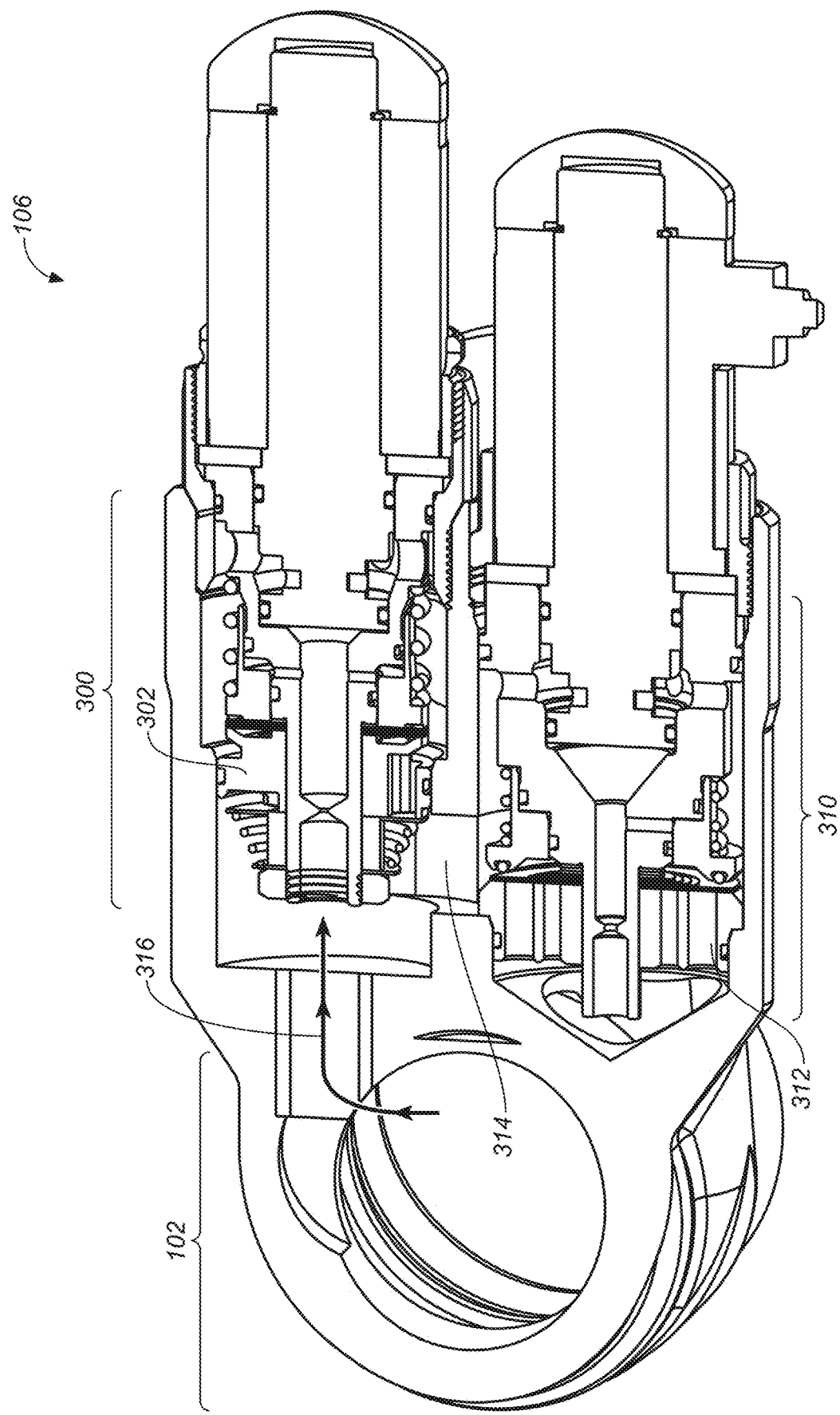
FIG. 3 is a cut-away view of an electronic valve assembly, including a compression fluid flow path, in accordance with an embodiment of the present invention.

Referring now to FIG. 3, a cut-away view of electronic valve assembly 106 is shown including a fluid flow path, shown by arrow 316. Electronic valve assembly 106 includes a first electronic valve 300 and a second electronic valve 310. Among various other components, first electronic valve 300 includes a valve piston 302, and second electronic valve 310 includes a valve piston 312. The structure and operation of electronic valves are described in detail in U.S. Pat. No. 9,452,654 which, as stated above, is incorporated herein by reference in its entirety. Unlike the teachings of U.S. Pat. No. 9,452,654, in the present embodiments, first electronic valve 300 and second electronic valve 310 are disposed offset with respect to each other. As a result, in the present embodiments, valve piston 302 and valve piston 312 are not equally spaced from damping cylinder 102. More specifically, in the present embodiment, the distance of valve piston 302 from damping cylinder 102 is greater than the distance of valve piston 312 from damping cylinder 102. Furthermore, in the present embodiment, unlike the teachings U.S. Pat. No. 9,452,654, a channel 314 between first electronic valve 300 and second electronic valve 310 is disposed such that channel 314 is located in front of valve piston 302. That is, channel 314 is closer to damping cylinder 102 than is valve piston 302. Additionally, as shown in FIG. 3, in the present embodiment, channel 314 between first electronic valve 300 and second electronic valve 310 is disposed such that channel 314 is located behind valve piston 312. That is, valve piston 312 is closer to damping cylinder 102 than is channel 314.

Referring still to FIG. 3, several significant benefits are realized by the offset orientation of first electronic valve 300 and second electronic valve 310. In the present embodiment, first electronic valve 300 is disposed along a fluid flow path (see arrow 316) extending between compression region 114 (of FIG. 2) of damping cylinder 102 and reservoir chamber 104 (of FIG. 2). During compression, shaft displaced fluid flows from damping cylinder 102 through first electronic valve 300 along a fluid flow path indicated by arrow 316. The shaft displaced fluid flows through valve piston 302 and then (via an opening, not shown) into reservoir chamber 104 (See arrow 122 of FIG. 2). In so doing, in the present embodiment, first electronic valve 300 controls the flow of shaft displaced fluid from compression region 114 of damping cylinder 102 into reservoir chamber 104. Importantly, in the present embodiment, unlike the teachings of U.S. Pat. No. 9,452,654, shaft displaced fluid flows only through first electronic valve 300 and into reservoir chamber 104. That is, in the present embodiment, shaft displaced fluid does not flow through second electronic valve 310. Thus, in the present embodiment, second electronic valve 310 does not reside in the fluid flow path 316 extending from compression region 114 of damping cylinder 102 into reservoir chamber 104.

Importantly, it should be noted that in various embodiments of the present invention, first electronic valve 300 is operated independently of second electronic valve 310. Similarly, in various embodiments of the present invention, second electronic valve 310 is operated independently of first electronic valve 300. Thus, in various embodiments, the present invention provides independent control of compression and rebound damping of vehicle suspension damper 100. A further description of various sensors and a control system used in conjunction with first electronic valve 300 to control vehicle suspension damper 100 and adjust a damping force therein is provided below.

With reference now to FIGS. 2 and 3, in the present embodiment, only shaft displaced fluid flows through first electronic valve 300. As a result, first electronic valve 300 can be smaller than a valve which needs to control more fluid than just the shaft displaced fluid. This allows electronic valve assembly 106 to be smaller and less expensive than a valve assembly that is required to control a larger volume of fluid. Further, as first electronic valve 300 operates by controlling a smaller volume of fluid (only the shaft displaced fluid), first electronic valve 300 is able to effectively provide control of compression damping for vehicle suspension damper 100 even during low speed movement of piston shaft 108 and damping piston 110. Additionally, the inclusion of bypass openings 112 and annular chamber 118, along with controlling shaft displaced fluid flow, enables the present embodiment to concurrently achieve position dependent damping and compression damping control even during low speed movement of piston shaft 108 and damping piston 110.

Figure 4:
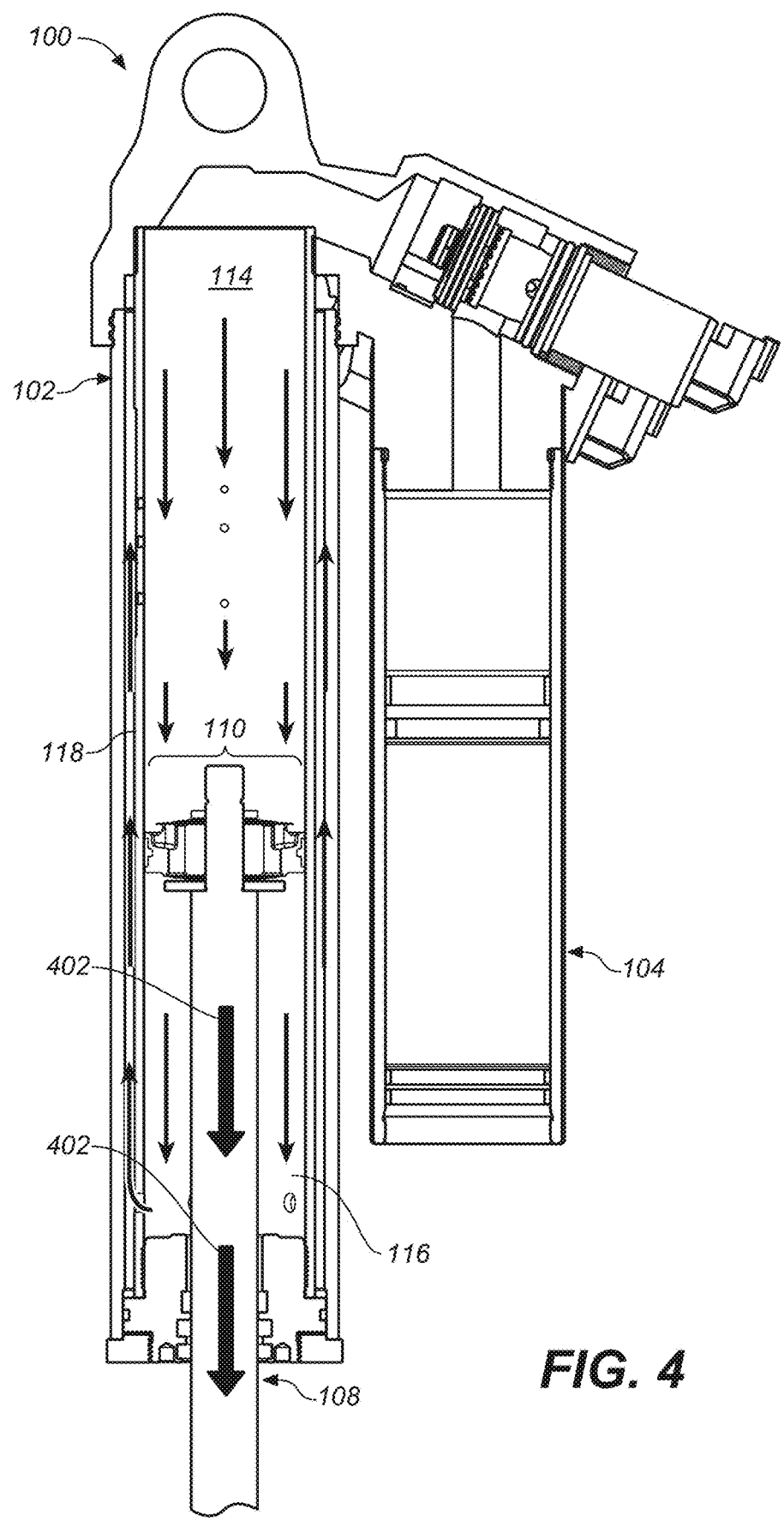
FIG. 4 is a cut-away view of a vehicle suspension damper depicted during compression, in accordance with an embodiment of the present invention.

With reference now to FIG. 4, a cut-away view of vehicle suspension damper 100 is shown. During rebound of vehicle suspension damper 100 (i.e. movement of piston shaft 108 and damping piston 110 out of damping cylinder 102 as shown by arrows 402), fluid will typically flow from below damping piston 110 through annular chamber 118 and ultimately into compression region 114 above damping piston 110. Additionally, in some embodiments, during rebound, fluid will also pass from rebound region 116 to compression region 114 by passing through valving in damping piston 110. In some embodiments, during rebound, fluid is prevented from flowing through damping piston 110 such that all fluid must flow through annular chamber 118 and ultimately into compression region 114 above damping piston 110. In some embodiments of the present invention, bypass openings 112 (of FIG. 2 and not shown in FIG. 4) are closed during rebound such that fluid is prevented from flowing from annular chamber 118 through bypass openings into the region above damping piston 110. Additionally, as piston shaft 108 exits damping cylinder 102, fluid must replace the volume of piston shaft 108 which has exited damping cylinder 102. The fluid which replaces the volume of piston shaft 108 which has exited damping cylinder 102 is typically provided from reservoir chamber 104.

Figure 5:
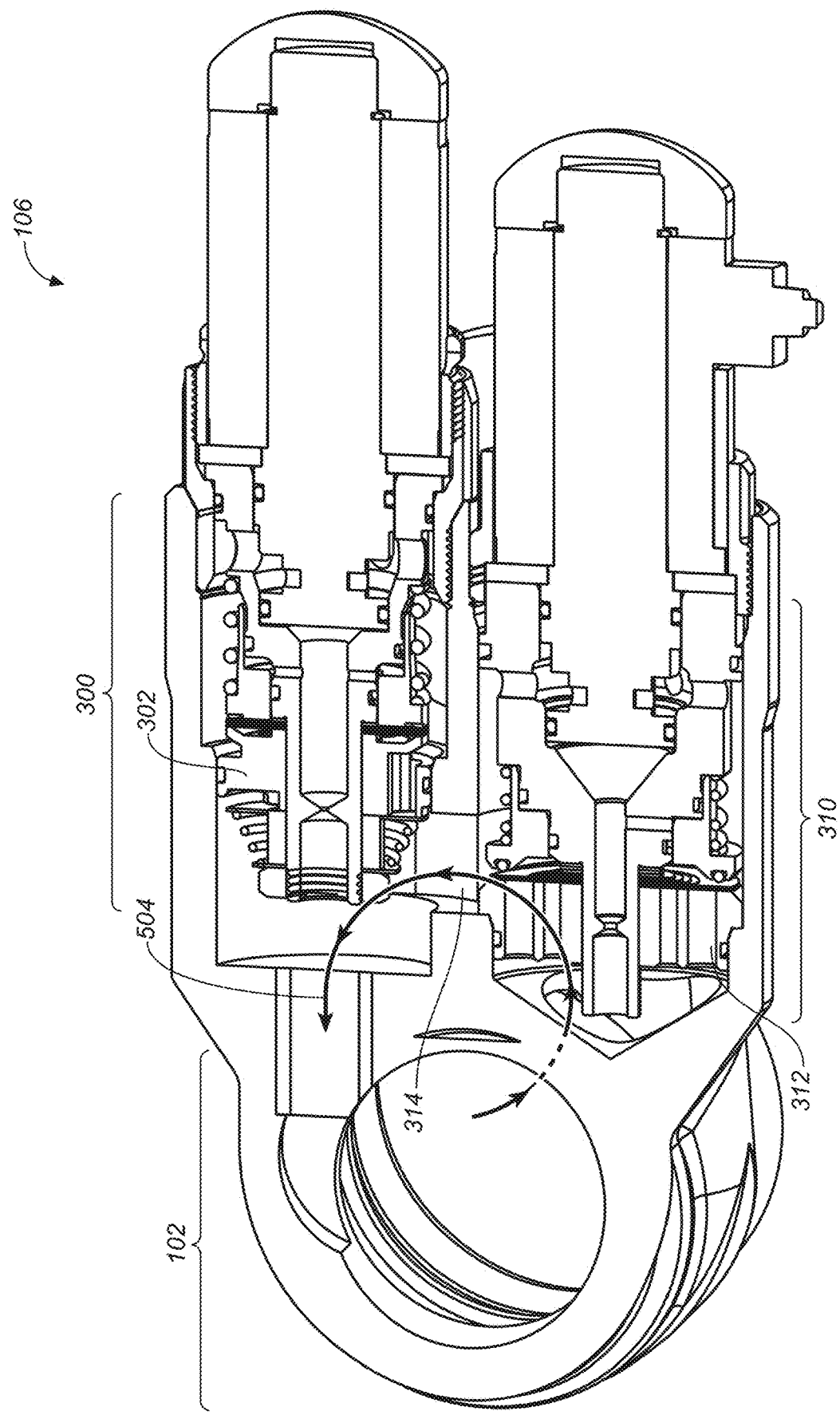
FIG. 5 is a cut-away view of an electronic valve assembly including a rebound fluid flow path, in accordance with an embodiment of the present invention.

Referring now to FIG. 5, a cut-away view of electronic valve assembly 106 is shown including a fluid flow path, shown by arrow 504. As stated above, during rebound, fluid will typically flow from below damping piston 110 through annular chamber 118 and ultimately into compression region 114 above damping piston 110 (all of FIG. 4). As will be described in detail below, in the present embodiment, electronic valve assembly 106 controls the flow of fluid from rebound region 116 (of FIG. 4) and ultimately to compression region 114. As was described in conjunction with FIG. 3, electronic valve assembly 106 includes a first electronic valve 300 and a second electronic valve 310. Among various other components, first electronic valve 300 includes a valve piston 302, and second electronic valve 310 includes a valve piston 312. Again, the structure and operation of electronic valves are described in detail in U.S. Pat. No. 9,452,654 which, as stated above, is incorporated herein by reference in its entirety. Unlike the teachings of U.S. Pat. No. 9,452,654, in the present embodiments, first electronic valve 300 and second electronic valve 310 are disposed offset with respect to each other.

Referring again to FIGS. 4 and 5, in the present embodiment, during rebound, fluid flows from rebound region 116 through annular chamber 118 through opening 502, and through second electronic valve 310. More specifically, in the present embodiment, during rebound, fluid flows from beneath damping piston 110, into annular chamber 118, through opening 502, and through second electronic valve 310. As described below, second electronic valve 310 is configured to control flow of fluid from rebound region 116 of damping cylinder 102 and into compression region 114 of damping cylinder 102. Specifically, during rebound, fluid flows through valve piston 312 of second electronic valve 310, through channel 314 and then into compression region 114 of damping cylinder 102 along a fluid flow path indicated by arrow 504. Importantly, in the present embodiment, unlike the teachings of U.S. Pat. No. 9,452,654, during rebound, fluid flows only through second electronic valve 310 (and valve piston 312) and back into compression region 114 of damping cylinder 102. That is, in the present embodiment, rebound fluid does not flow through first electronic valve 300. Thus, in the present embodiment, first electronic valve 300 (including valve piston 302) does not reside in fluid flow path 504 extending from rebound region 116 of damping cylinder 102 into compression region 114.

With reference still to FIG. 5, first electronic valve 300 does not impede the flow of fluid during rebound. Thus, second electronic valve 310 experiences a less pressurized flow of fluid than would be experienced if fluid flow was subsequently impeded, during rebound, by first electronic valve 300. Additionally, as fluid flows rates tend be lower during rebound than compression, second electronic valve 310 can be smaller as it does not typically have handle higher fluid flow rates. As a result, second electronic valve 310 can be smaller than a valve which must control impeded fluid flow or greater fluid flow rates. These factors allow electronic valve assembly 106 to be smaller and less expensive than a valve assembly that is required to handle impeded fluid flow or high fluid flow rates during rebound.

Importantly, it should be noted that in various embodiments of the present invention, second electronic valve 310 is operated independently of first electronic valve 300. Similarly, in various embodiments of the present invention, first electronic valve 300 is operated independently of second electronic valve 310. Thus, in various embodiments, the present invention provides independent control of rebound and compression damping of vehicle suspension damper 100. A further description of various sensors and a control system used in conjunction with second electronic valve 310 to control vehicle suspension damper 100 and adjust a rebound damping force therein is provided below.

Figure 6:
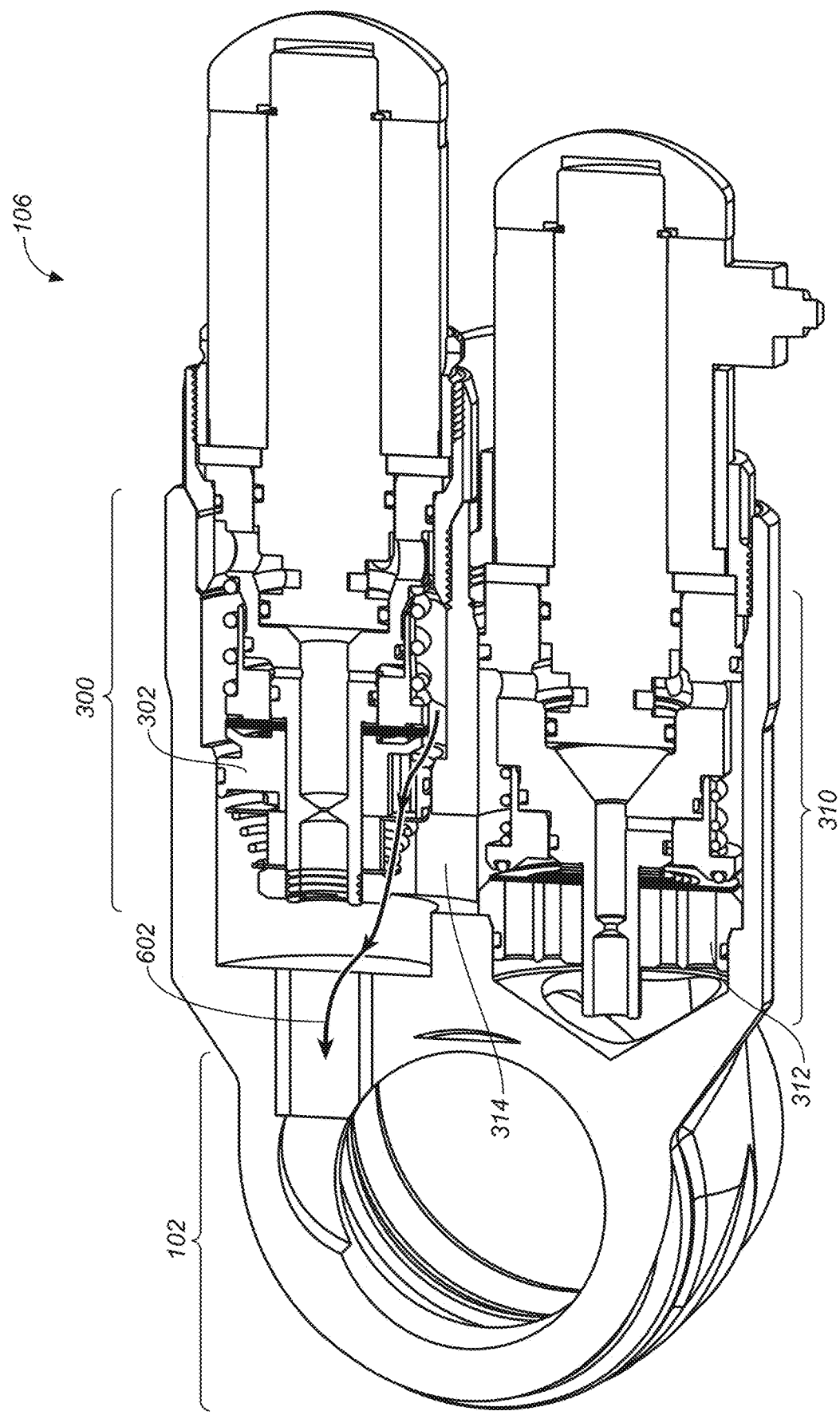
FIG. 6 is a cut-away view of an electronic valve assembly including a fluid flow path from a reservoir chamber back into the damping cylinder, in accordance with an embodiment of the present invention.

With reference now to FIG. 6, a cut-away view of electronic valve assembly 106 is shown including a fluid flow path, shown by arrow 602. As stated above, during rebound, piston shaft 108 exits damping cylinder 102, and fluid must replace the volume of piston shaft 108 which has exited damping cylinder 102 (all of FIG. 4). The fluid which replaces the volume of piston shaft 108 which has exited damping cylinder 102 is typically provided from reservoir chamber 104 (of FIG. 4). In the present embodiment, unlike the teachings of U.S. Pat. No. 9,452,654, during rebound, fluid from reservoir chamber 104 flows only through first electronic valve 300 and back into compression region 114 of damping cylinder 102. More specifically, fluid flows from reservoir chamber 104, through an opening, not shown, through valve piston 302, and back into compression region 114 of damping cylinder 102 along a fluid flow path indicated by arrow 602. Hence, first electronic valve 300 is configured to control flow of fluid from reservoir chamber 104 to compression region 114 of damping cylinder 102. Importantly, in the present embodiment, fluid from reservoir chamber 104 does not flow through second electronic valve 310. Moreover, in the present embodiment, second electronic valve 310 (including valve piston 312) does not reside in fluid flow path 602 extending from reservoir chamber 104 into compression region 114.

As a result of fluid passing only through piston valve 302 and not also through valve piston 312, a greater flow rate and a less pressurized flow of fluid is achieved during rebound for the fluid flow coming from reservoir chamber 104 towards compression region 114. Additionally, as shaft displaced fluid flow rates tend be low, and especially low during rebound, first electronic valve 300 can be smaller as it does not typically have to handle higher fluid flow rates. As a result, first electronic valve 300 can be smaller than a valve which must control impeded fluid flow or greater fluid flow rates. These factors allow electronic valve assembly 106 to be smaller and less expensive than a valve assembly that is required to handle impeded shaft displaced fluid flow or high fluid flow rates during rebound.

As stated above, it should be noted that in various embodiments of the present invention, first electronic valve 300 is operated independently of second electronic valve 310. Thus, in various embodiments, the present invention provides independent control of the flow for the replacement of shaft displaced fluid during rebound damping of vehicle suspension damper 100. A further description of various sensors and a control system used in conjunction with first electronic valve 300 to control the flow for the replacement of shaft displaced fluid and adjust a rebound damping force in vehicle suspension damper 100 is provided below.

Figure 7:
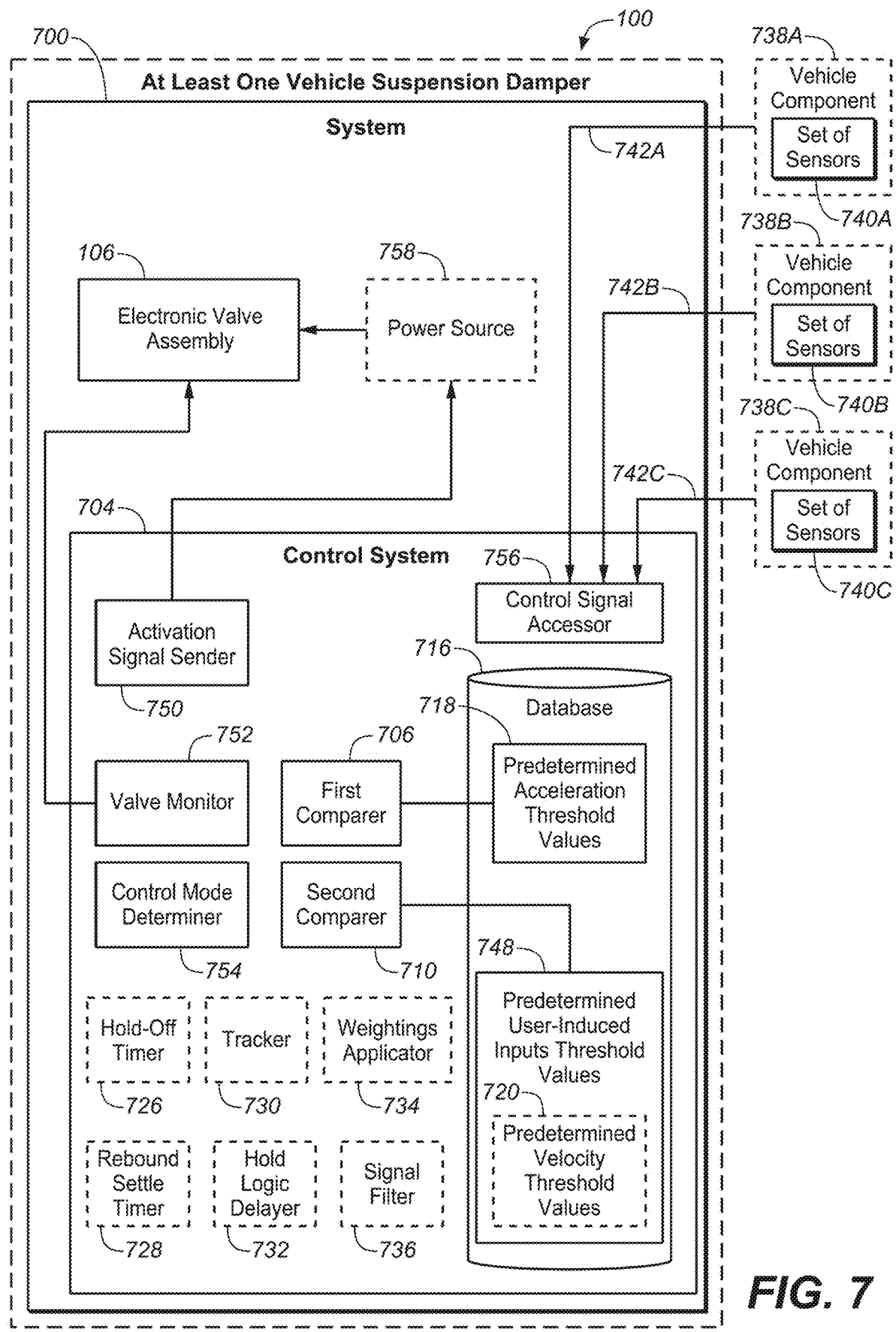
FIG. 7 is a schematic diagram depicting various sensors and a control system used in conjunction with an electronic valve assembly for adjusting a damping force in a vehicle suspension damper, in accordance with an embodiment of the present invention.

With reference now to FIG. 7, a schematic diagram depicting various sensors and a control system used in conjunction with electronic valve assembly 106 for adjusting a damping force in vehicle suspension damper 100 is provided. The structure and operation of the various components of FIG. 7 are described in detail in U.S. Pat. No. 9,452,654 which, as stated above, is incorporated herein by reference in its entirety.

FIG. 7 for controlling vehicle motion is described in relation to controlling the operation of a multi-wheeled vehicle that has more than two wheels, such as, but not limited to, trucks, cars, and more specialized vehicles such as, but not limited to side-by-sides and snowmobiles, in accordance with embodiments. It should be appreciated that while the following discussion focuses on vehicles with four wheels, it should be appreciated that embodiments are not limited to controlling the operation upon vehicles with four wheels. For example, embodiments may be used with vehicles with three wheels, five wheels, six wheels, etc. Four-wheeled vehicles may have four vehicle suspension dampers attached therewith, one vehicle suspension damper attached to each wheel and to the vehicle's frame. In one embodiment, the embodiment depicted in FIG. 7 includes an electronic valve assembly 106 as described above.

Various components of FIG. 7 not only deduce the vertical acceleration values, but also deduce, from a received set of control signals (that include acceleration values associated with various vehicle components), the roll and pitch of a vehicle with more than two wheels. These measured acceleration values relate to the tilt (e.g., roll, pitch) of the vehicle and are compared to a database having thereon preprogrammed acceleration threshold values associated with vehicle components as it relates to tilt. Further, various components of FIG. 7 receive measured velocity values associated with user-induced events (e.g., turning a steering wheel, pressing/releasing a brake pedal, pressing/releasing the gas pedal, thereby causing a throttle to open/close). The control system compares these measured velocity values relating to user-induced events to a database having preprogrammed thereon velocity threshold values associated with vehicle components. Based on the comparison performed with regard to the measured acceleration values with the predetermined acceleration threshold values and the measured velocity values with the predetermined velocity threshold values, as well as the determined state of valves within various vehicle suspension dampers attached to vehicle components, the control system sends an activation signal to power sources of the vehicle suspension dampers. The activation signal activates the power source to deliver a current to one or more of first electronic valve 300 and second electronic valve 310 of electronic valve assembly 106. Once delivered, first electronic valve 300 and second electronic valve 310 of electronic valve assembly 106 adjust to a desired state. The desired state is configured to adjust the damping force to reduce or eliminate the tilt of the vehicle's frame. In other words, the orientation of the vehicle frame is placed as close to level as possible.

As will be described herein, various components of FIG. 7 also provide various system modes within which the vehicle suspension dampers may operate, along with control modes for affecting roll and pitch dynamics of the vehicle. Thus, described first herein are systems and methods for controlling a vehicle's motion by increasing and/or decreasing damping forces within a vehicle suspension damper in quick response to sensed movement of vehicle components (e.g., vehicle wheel base). These systems and methods may be used in various types of multi-wheeled vehicles, such as, but not limited to, side-by-sides (four-wheel drive off-road vehicle), snow mobiles, etc. These systems and methods may be used to control both the front and the rear shock. The systems and methods described herein quickly and selectively apply damping forces through the vehicle suspension dampers (that are coupled with both the vehicle's forks and the vehicle's frame). Such damping enables the vehicle's frame, and thus the vehicle's rider, to experience less acceleration than that being experienced by the wheel base(s).

The system 700 and method, as will be described, detects rolls, pitches, and heaves of four-wheeled vehicles. For example and with regard to detecting rolls, if a car turns a corner sharply left and begins to roll to the right, embodiments sense the velocity of the steering wheel as it is being turned, as well as the translational acceleration associated with the roll experienced by the vehicle. The translational acceleration (distance/time$^2$) associated with the roll measures side accelerations. In response to this sensing and in order to control the roll, a control system causes the outer right front and back vehicle suspension dampers to firm up, in some embodiments. Of note, in some embodiments, the vehicle's pitch is measured by sensing the velocity of the throttle pedal as it is being pressed and/or released. In other embodiments, the vehicle's pitch may also be measured by sensing the velocity and/or the position of the throttle pedal as it is being pressed and/or released. In yet other embodiments, the vehicle's pitch is measured by sensing the acceleration of the vehicle. Of further note, the control system does not utilize throttle pedal information to measure roll.

In one embodiment, the system 700 includes electronic valve assembly 106 (that includes first electronic valve 300 and second electronic valve 310) and the control system 704. In one embodiment, the control system 704 includes the following components: a control signal accessor 756; a first comparer 706; a second comparer 710; a valve monitor 752; a control mode determiner 754; and an activation signal sender 750. The second comparer 710 compares the accessed user-induced inputs to predetermined user-induced inputs threshold values 748 found at, in one embodiment, the database 716 (in another embodiment, a database residing external to the control system 704. Further, in various embodiments, the control system 704 optionally includes any of the following: a database 716, a hold-off timer 726; a tracker 730; a hold logic delayer 732; a rebound settle timer 728; a weightings applicator 734; and a signal filter 736. The database 716, according to various embodiments, optionally includes predetermined acceleration threshold values 718 and predetermined user-induced inputs threshold values 748. In various embodiments, the predetermined user-induced inputs threshold values 748 include predetermined velocity threshold values 720. In other embodiments, the predetermined user-induced inputs threshold values include any of the following values: steering velocity threshold value; shock absorber velocity threshold value; brake velocity threshold value; steering position threshold value; throttle position threshold value; shock absorber position threshold value; and brake threshold value.

In one embodiment, the control system 704 may be part of a vehicle suspension damper 100 (that is, for example, on a side-by-side), or it may be wire/wirelessly connected to the control system 704. As will be discussed below, the control system 704 of FIG. 7 is further configured for comparing a set of values associated with at least one user-induced input (such as a user turning a steering wheel and the velocity resulting therefrom) with at least one user-induced input threshold value.

Embodiments of the present invention provide for a control system 704 that accesses a set of control signals 742 (control signal 742A, control signal 742B and control signal 742C; it should be appreciated that there may be any number of control signals, depending on the number of sensors coupled with vehicle components) that includes both acceleration values and a set of values associated with user-induced inputs (such as velocity values [of a steering wheel being turned and/or a throttle pedal being pressed upon and/or released] measured by a set of gyrometers). It should be appreciated that the set of sensors 740A, 740B and 740C (hereinafter, set of sensors 740, unless specifically noted otherwise) attached to the vehicle component 738A, 738B and 738C (hereinafter, vehicle component 738, unless specifically noted otherwise), respectively, may include one or more sensors, such as, but not limited to, accelerometers and gyrometers. In some embodiments, the acceleration values with respect to the four-wheeled vehicles are lateral (side-to-side motion) and longitudinal g's (forward and backwards motion). In other embodiments, the acceleration values with respect to four-wheeled vehicles are lateral g's, longitudinal g's and vertical g's (up and down motion). User-induced inputs, according to embodiments, are those inputs by a user that cause a movement to a vehicle component of the vehicle. For example, user-induced inputs may include, but are not limited to any of the following: turning a steering wheel; pressing a brake pedal (the ON/OFF resultant position of the brake pedal being pressed is measured); and pressing a throttle pedal (a velocity and/or position of the throttle pedal is measured). Thus, a set of values associated with the user-induced inputs may be, but are not limited to being, any of the following user-induced inputs: a measured velocity value of the turning of a steering wheel; a brake's on/off status; velocities associated with pressing down on the brake and/or the throttle pedal; and the difference in the positions of the throttle pedal before and after being pressed (or the absolute throttle position). Of note, the user-induced inputs that are measured are inputs received before acceleration is measured, yet relevant in quickly determining corrective damping forces required to control the roll, pitch and heave once experienced. Thus, the user-induced inputs are precursors to the sensed accelerations of various vehicle components (e.g., vehicle wheels).

Once these values (measured acceleration value and the set of values associated with the user-induced inputs) are accessed by the control signal accessor 756, the first comparer 706 and the second comparer 710 compare these values to threshold values, such as those found in the database 716 (a store of information). Further, according to embodiments, the activation signal sender 750 sends an activation signal to the power source 758 to deliver a current to one or more of first electronic valve 300 and second electronic valve 310 of electronic valve assembly 106, based upon the following: 1) the comparison made between the measured acceleration value and the predetermined acceleration threshold value 718 discussed herein; 2) the comparison made between the measured velocity of the steering wheel as it is being turned (the set of values associated with user-induced inputs) and the predetermined velocity threshold value 720 of the predetermined user-induced inputs threshold values 748; and 3) the monitoring of the state of electronic valve assembly 106.

It should be appreciated that embodiments may include, but are not limited to, other configurations having a control system in wire/wireless communication with the vehicle suspension damper to which it is controlling, such as: 1) a vehicle with only one control system that is wire and/or wirelessly connected to all vehicle suspension dampers attached thereto; 2) a vehicle with one control system attached to one vehicle suspension damper, wherein the one control system controls the other control systems attached to other vehicle suspension dampers (that are attached to different wheels) of the vehicle; and 3) a vehicle with one control system that is not attached to a vehicle suspension damper, wherein the one control system controls other control systems that are attached to vehicle suspension dampers on the vehicle.

It should be noted that any of the features disclosed herein may be useful alone or in any suitable combination. While the foregoing is directed to embodiments of the present invention, other and further embodiments of the invention may be implemented without departing from the scope of the invention, and the scope thereof is determined by the claims that follow.

I claim:

1. An electronic valve assembly for a vehicle suspension damper, said electronic valve assembly comprising:
   a first electronic valve disposed along a fluid flow path extending between a compression region of a damping cylinder and a fluid reservoir chamber, said first electronic valve configured to control flow of fluid from said compression region of said damping cylinder into said fluid reservoir chamber;
   a second electronic valve disposed along a fluid flow path extending between a rebound region of said damping cylinder and said compression region of said damping cylinder, said second electronic valve configured to control flow of fluid from said rebound region of said damping cylinder into said compression region of said damping cylinder; and wherein a first distance between said first electronic valve and said damping cylinder is greater than a second distance between said second electronic valve and said damping cylinder.

2. The electronic valve assembly of claim 1 wherein, said first electronic valve and said second electronic valve are disposed such that said first electronic valve does not reside in said fluid flow path extending from said rebound region of said damping cylinder into said compression region of said damping cylinder, and said second electronic valve does not reside in said fluid flow path extending from said compression region of said damping cylinder into said fluid reservoir chamber.

3. The electronic valve assembly of claim 1 wherein said first electronic valve controls flow of fluid displaced by a piston shaft as said fluid displaced by said piston shaft flows from said compression region of said damping cylinder into said fluid reservoir chamber.

4. The electronic valve assembly of claim 1 wherein said first electronic valve is configured to control flow of fluid from said fluid reservoir chamber to said compression region of said damping cylinder.

5. The electronic valve assembly of claim 4 wherein said second electronic valve does not reside in a fluid flow path extending from said fluid reservoir chamber to said compression region of said damping cylinder.

6. The electronic valve assembly of claim 1 wherein said first electronic valve and said second electronic valve can be operated independently of each other.

7. A system for controlling vehicle motion, said system comprising:
a sensor coupled with a vehicle, said sensor sensing said vehicle motion; and
a vehicle suspension damper coupled with said sensor, said vehicle suspension damper adjusting a damping force therein, said vehicle suspension damper comprising:
a damping cylinder;
a damping piston movable within said damping cylinder;
a compression region at least partially defined by said damping piston;
a rebound region at least partially defined by said damping piston;
a fluid reservoir chamber fluidically coupled to said damping cylinder; and
electronic valve assembly coupled with said sensor, said electronic valve assembly comprising:
a first electronic valve disposed along a fluid flow path extending between said compression region and said fluid reservoir chamber, said first electronic valve configured to control flow of fluid from said compression region into said fluid reservoir chamber;
a second electronic valve disposed along a fluid flow path extending between said rebound region and said compression region, said second electronic valve configured to control flow of fluid from said rebound region into said compression region; and
wherein a first distance between said first electronic valve and said damping cylinder is greater than a second distance between said second electronic valve and said damping cylinder.

8. The electronic valve assembly of claim 7 wherein, said first electronic valve and said second electronic valve are disposed such that said first electronic valve does not reside in said fluid flow path extending from said rebound region into said compression region, and said second electronic valve does not reside in said fluid flow path extending from said compression region into said fluid reservoir chamber.

9. The system of claim 7 wherein said first electronic valve controls flow of fluid displaced by a piston shaft as said fluid displaced by said piston shaft flows from said compression region into said fluid reservoir chamber.

10. The system of claim 7 wherein said first electronic valve is configured to control flow of fluid from said fluid reservoir chamber to said compression region.

11. The system of claim 10 wherein said second electronic valve does not reside in a fluid flow path extending from said fluid reservoir chamber to said compression region.

12. The system of claim 7 wherein said first electronic valve and said second electronic valve can be operated independently of each other.

13. The system of claim 12 wherein independent operation of said first electronic valve and said second electronic provides independent control of compression and rebound damping of said vehicle suspension damper.

14. A system for providing independent control of compression and rebound damping of a vehicle suspension damper, said system comprising:
a sensor coupled with a vehicle, said sensor sensing motion of said vehicle; and
a vehicle suspension damper, said vehicle suspension damper configured to adjust a damping force therein, said vehicle suspension damper comprising:
a damping cylinder;
a damping piston movable within said damping cylinder;
a compression region at least partially defined by said damping piston;
a rebound region at least partially defined by said damping piston;
a fluid reservoir chamber fluidically coupled to said damping cylinder; and
electronic valve assembly coupled with said sensor, said electronic valve assembly comprising:
a first electronic valve disposed along a fluid flow path extending between said compression region and said fluid reservoir chamber, said first electronic valve configured to control flow of fluid from said compression region into said fluid reservoir chamber;
a second electronic valve disposed along a fluid flow path extending between said rebound region and said compression region, said second electronic valve configured to control flow of fluid from said rebound region into said compression region, said first electronic valve and said second electronic valve operable independently of each other; and
wherein a first distance between said first electronic valve and said damping cylinder is greater than a second distance between said second electronic valve and said damping cylinder such that independent control of said compression and rebound damping of said vehicle suspension damper is possible.

15. The electronic valve assembly of claim 14 wherein, said first electronic valve and said second electronic valve are disposed such that said first electronic valve does not reside in said fluid flow path extending from said rebound region into said compression region, and said second electronic valve does not reside in said fluid flow path extending from said compression region into said fluid reservoir chamber.

16. The system of claim 14 wherein said first electronic valve controls flow of fluid displaced by a piston shaft as said fluid displaced by said piston shaft flows from said compression region into said fluid reservoir chamber.

17. The system of claim 14 wherein said first electronic valve is configured to control flow of fluid from said fluid reservoir chamber to said compression region.

18. The system of claim 17 wherein said second electronic valve does not reside in a fluid flow path extending from said fluid reservoir chamber to said compression region.

19. An electronic valve assembly for a vehicle suspension damper, said electronic valve assembly comprising:
a first electronic valve disposed along a fluid flow path extending between a compression region of a damping cylinder and a fluid reservoir chamber, said first electronic valve configured to control flow of fluid from said compression region of said damping cylinder into said fluid reservoir chamber, said first electronic valve including a valve piston;
a second electronic valve disposed along a fluid flow path extending between a rebound region of said damping cylinder and said compression region of said damping cylinder, said second electronic valve configured to control flow of fluid from said rebound region of said damping cylinder into said compression region of said damping cylinder; and
wherein a first distance between said first electronic valve and said damping cylinder is greater than a second distance between said second electronic valve and said damping cylinder.

20. The electronic valve assembly of claim 19 wherein, said first electronic valve and said second electronic valve are disposed such that fluid flowing along said flow path extending from said rebound region of said damping cylinder into said compression region of said damping cylinder does not flow through said valve piston of said first electronic valve.

21. An electronic valve assembly for a vehicle suspension damper, said electronic valve assembly comprising:
a first electronic valve disposed along a fluid flow path extending between a compression region of a damping cylinder and a fluid reservoir chamber, said first electronic valve configured to control flow of fluid from said compression region of said damping cylinder into said fluid reservoir chamber;
a second electronic valve disposed along a fluid flow path extending between a rebound region of said damping cylinder and said compression region of said damping cylinder, said second electronic valve configured to control flow of fluid from said rebound region of said damping cylinder into said compression region of said damping cylinder, said second electronic valve including a valve piston; and
wherein a first distance between said first electronic valve and said damping cylinder is greater than a second distance between said second electronic valve and said damping cylinder.

22. The electronic valve assembly of claim 21 wherein, said first electronic valve and said second electronic valve are disposed such that fluid flowing along said flow path extending from said compression region of said damping cylinder into said fluid reservoir chamber does not flow through said valve piston of said second electronic valve.

23. An electronic valve assembly for a vehicle suspension damper, said electronic valve assembly comprising:
a first electronic valve disposed along a fluid flow path extending between a compression region of a damping cylinder and a fluid reservoir chamber, said first electronic valve configured to control flow of fluid from said compression region of said damping cylinder into said fluid reservoir chamber, said first electronic valve including a valve piston;
a second electronic valve disposed along a fluid flow path extending between a rebound region of said damping cylinder and said compression region of said damping cylinder, said second electronic valve configured to control flow of fluid from said rebound region of said damping cylinder into said compression region of said damping cylinder chamber, said second electronic valve including a valve piston; and
wherein a first distance between said first electronic valve and said damping cylinder is greater than a second distance between said second electronic valve and said damping cylinder.

24. The electronic valve assembly of claim 23 wherein, said first electronic valve and said second electronic valve are disposed such that fluid flowing along a flow path extending from said fluid reservoir chamber to said compression region of said damping cylinder does not flow through said valve piston of said second electronic valve.

25. An electronic valve assembly for a vehicle suspension damper, said electronic valve assembly comprising:
a first electronic valve including a valve piston, said first electronic valve fluidically coupled to a reservoir chamber of said vehicle suspension damper;
a second electronic valve including a valve piston, wherein said second electronic valve is offset from said first electronic valve such that a distance of valve piston of said first electronic valve from a damping cylinder of said vehicle suspension damper is greater than a distance of said valve piston of said second electronic valve from said damping cylinder;
a channel disposed between said first electronic valve and said second electronic valve, said channel located such that a distance of said valve piston of said first electronic valve from said damping cylinder is greater than a distance of said channel from said damping cylinder;
a first fluid flow path including said first electronic valve; and
a second fluid flow path including said second electronic valve and said channel, wherein fluid is limited to flowing in said second fluid flow path during rebound.

* * * * *